(12) United States Patent
Sakata et al.

(10) Patent No.: US 8,326,456 B2
(45) Date of Patent: Dec. 4, 2012

(54) BEHAVIOR CONTROL APPARATUS, METHOD, AND PROGRAM

(75) Inventors: Kotaro Sakata, Osaka (JP); Ryuji Inoue, Osaka (JP); Toshiya Naka, Hyogo (JP)

(73) Assignee: Panasonic Corporation, Osaka (JP)

( * ) Notice: Subject to any disclaimer, the term of this patent is extended or adjusted under 35 U.S.C. 154(b) by 908 days.

(21) Appl. No.: 12/044,536

(22) Filed: Mar. 7, 2008

(65) Prior Publication Data
US 2008/0221730 A1 Sep. 11, 2008

(30) Foreign Application Priority Data
Mar. 7, 2007 (JP) ................................ 2007-056991

(51) Int. Cl.
*G06F 19/00* (2006.01)
*B25J 13/00* (2006.01)
(52) U.S. Cl. ........ 700/245; 700/214; 700/228; 700/264; 704/270; 706/16; 382/153; 901/1
(58) Field of Classification Search .................. 700/245, 700/214, 228, 264; 704/270; 706/16; 382/153; 901/1
See application file for complete search history.

(56) References Cited

U.S. PATENT DOCUMENTS

| | | | |
|---|---|---|---|
| 2004/0243281 A1* | 12/2004 | Fujita et al. | 700/245 |
| 2005/0197739 A1* | 9/2005 | Noda et al. | 700/245 |
| 2005/0216121 A1* | 9/2005 | Sawada et al. | 700/245 |
| 2005/0240412 A1* | 10/2005 | Fujita | 704/270 |
| 2006/0111812 A1* | 5/2006 | Okamoto et al. | 700/214 |
| 2006/0112034 A1* | 5/2006 | Okamoto et al. | 706/16 |
| 2006/0116973 A1* | 6/2006 | Okamoto et al. | 706/16 |
| 2006/0129506 A1* | 6/2006 | Edelman et al. | 706/12 |
| 2006/0195226 A1* | 8/2006 | Matsukawa et al. | 700/245 |

FOREIGN PATENT DOCUMENTS
JP 2004-66367 3/2004
* cited by examiner

*Primary Examiner* — Ronnie Mancho
(74) *Attorney, Agent, or Firm* — Wenderoth, Lind & Ponack, L.L.P.

(57) ABSTRACT

A behavior control apparatus collects information of a mobile object in relation to an action space of the mobile object, and acquires a position and an orientation of a human. The behavior control apparatus sets an exclusive area for the human based on the position and the orientation, and judges whether any information is to be notified to the human by the mobile object. If judging negatively, the behavior control apparatus determines a target position, a target orientation and a travel route of the mobile object such that the mobile object moves out of the exclusive area.

25 Claims, 18 Drawing Sheets

FIG. 3

| | | | USER ATTRIBUTE INFORMATION | | | |
|---|---|---|---|---|---|---|
| NAME | ID | STATUS | USE DURATION | BASIC ATTRIBUTE | HOBBY | PREFERENCE |
| MATSUSHITA TARO | 01 | OWNER | 3208 DAYS | MALE, 34 YEARS OLD, LEFT-HANDED | READING | SENSITIVE TO HOT, SCARES EASILY |
| MATSUSHITA HANAKO | 02 | OWNER | 3208 DAYS | FEMALE, 32 YEARS OLD, RIGHT-HANDED | TALKING | SENSITIVE TO COLD |
| MATSUSHITA DAISUKE | 03 | OWNER | 3208 DAYS | MALE, 5 YEARS OLD, RIGHT-HANDED | BALL PLAYING | SENSITIVE TO HOT, SCARES EASILY |
| ‥ | ‥ | ‥ | ‥ | ‥ | ‥ | ‥ |
| YAMAMOTO JIRO | 07 | GUEST | 3 DAYS | MALE, 32 YEARS OLD, RIGHT-HANDED | MOVIES | SENSITIVE TO COLD |
| ‥ | ‥ | ‥ | ‥ | ‥ | ‥ | ‥ |

FIG. 5A

MAP INFORMATION (130)

| NAME | POSITION X, Y |
|---|---|
| ENTRANCE ROOM | X:3500, Y:8050,   X:4500, Y:8050,<br>X:4500, Y:9050,   X:3500, Y:9050 |
| LIVING ROOM | X:0, Y:0,   X:3500, Y:0,<br>X:3500, Y:3000,   X:0, Y:3000 |
| ⋮ | ⋮ |

FIG. 5B

LANDMARK INFORMATION (ENTRANCE ROOM) (140)

| NAME | POSITION X, Y ORIENTATION $\theta$ |
|---|---|
| UMBRELLA STAND | X:3525, Y:9025, $\theta$:0 |
| ⋮ | ⋮ |

FIG. 5C

LANDMARK INFORMATION (LIVING ROOM) (150)

| NAME | POSITION X, Y ORIENTATION $\theta$ |
|---|---|
| DOOR | X:4000, Y:3000, $\theta$:90 |
| BOOKSHELF | X:350, Y:2775, $\theta$:0 |
| TV SET | X:800, Y:800, $\theta$:45 |
| ⋮ | ⋮ |

FIG. 6

JUDGMENT CONDITION TABLE 160

| USER STATE 161 | OBJECT-IN-SIGHT 162 | DISTANCE TO OBJECT 163 | OBJECT STATE 164 | USER ACTION 165 |
|---|---|---|---|---|
| WATCHING TV | TV SET | NO MORE THAN 300 | POWER ON | SIT |
| CHOOSING A BOOK | BOOKSHELF | NO MORE THAN 200 | — | STAND |
| ... | ... | ... | ... | ... |
| START MOVING | DOOR/BOOKSHELF | 300, DECREASE | — | SIT > STAND |
| MOVING | DOOR/BOOKSHELF | 300, DECREASE | — | STAND |
| ... | ... | ... | ... | ... |
| TALKING | OTHER USER | NO MORE THAN 300 | VOICE | VOICE |
| ... | ... | ... | ... | ... |

FIG. 19
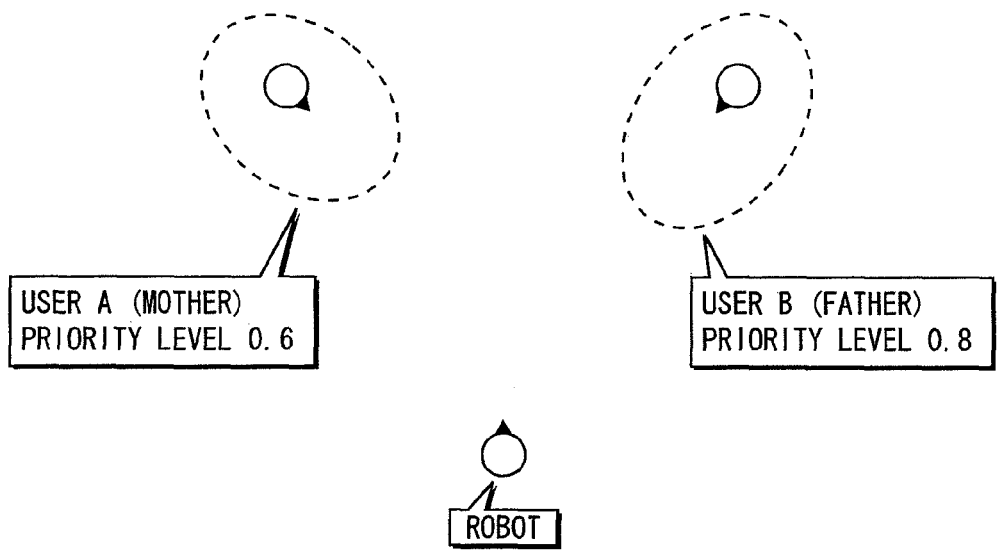
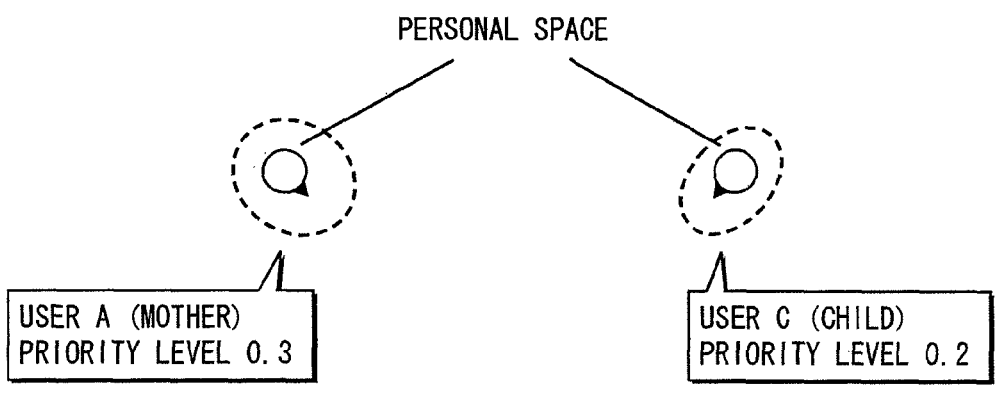
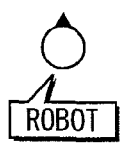

FIG. 20
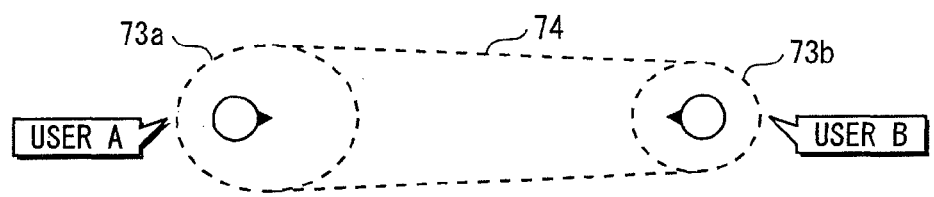
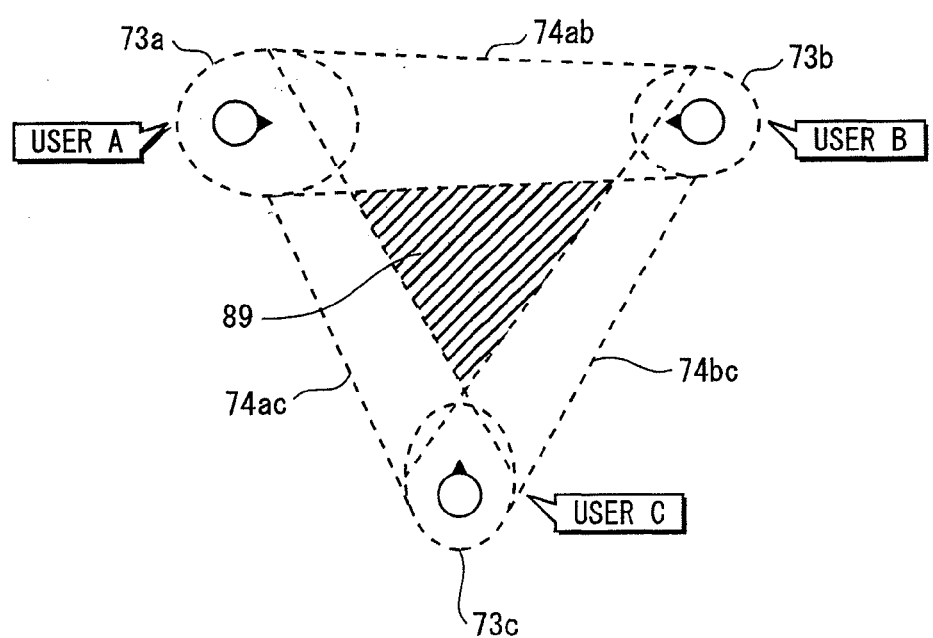

BEHAVIOR CONTROL APPARATUS, METHOD, AND PROGRAM

This application is based on an application No. 2007-056991 filed in Japan, the content of which is hereby incorporated by reference.

BACKGROUND OF THE INVENTION (1) Field of the Invention

The present invention relates to a behavior control apparatus that controls behavior of a mobile object, and particularly to a technique to control movement of a mobile object.

(2) Description of the Related Art

In recent years, mobile robots and mobile information apparatuses, which work as partners of or assistants to humans within living environments of the humans, have been developed. Some of them are designed to imitate appearances, physical mechanisms and behaviors of animals such as cats and dogs, or designed to have some characters, such that users have attachment to them.

For example, an application No. JP 2004-066367 discloses a technique to judge whether a user has an intention to communicate with a robot based on the distance between the user and the robot, and generate behavior patterns based on at least the judgment result and emotion data installed in the robot.

It is possible to enable a robot to exhibit various behaviors by giving a character to the robot. However, it is difficult to solve an inherent problem that the user would get bored with the behaviors of the robot over time. This is inevitable because the mobile robots and the mobile information apparatuses are not living matters, and are nothing more than machines.

Additionally, if a robot takes actions targeting the user who is engaged in some activities, such as watching TV and reading, the user will be distracted by the robot. As a result, the robot would be annoying to the user.

SUMMARY OF THE INVENTION

The object of the present invention is therefore to provide a behavior control apparatus that controls a mobile object so as not to unnecessarily intervene in user's activities.

The present invention provides a behavior control apparatus for controlling a mobile object having a movement mechanism, the behavior control apparatus comprising: an acquiring unit operable to acquire a position and an orientation of at least one human; a setting unit operable to determine a shape of an exclusive area for the human according to the acquired orientation, and set the exclusive area having the shape for the human with reference to the acquired position; a judging unit operable to judge whether any information is to be notified to the human by the mobile object; and a behavior determination unit operable, if the judging unit judges negatively, to control the movement mechanism of the mobile object such that the mobile object moves out of the exclusive area.

Here, the exclusive area is an area around the human including the human's position. As described above, the shape of the exclusive area is determined based on the orientation of the human. The mobile object basically avoids entering into this area.

With the stated structure, the mobile object does not position itself within the exclusive area as long as there is no information to be notified to the human. Accordingly, the mobile object does not unnecessarily interfere with the human's activity. As a result, the mobile object, operating in the human's living environment, can naturally fit in the human's life and share the human's life for a long time.

Here, the setting unit may include a state estimation unit operable to estimate which of a plurality of prescribed patterns shows a behavior of the human, and the setting unit may determine the shape of the exclusive area according to a pattern that has been estimated by the state estimation unit as showing the behavior of the human.

With the stated structure, since the shape of the exclusive area is determined based on the estimated behavior of the human, it is possible to more appropriately prevent the mobile object from interfering with the human's activity.

Here, the setting unit may determine the shape of the exclusive area according to both a psychological personal space of the human and the pattern that has been estimated by the state estimation unit. Also, the setting unit may determine the shape of the exclusive area according to a psychological personal space of the human.

The personal space of social psychology is defined as having an ellipsoidal shape or a similar shape. The behavior control apparatus with the stated structure is capable of controlling the mobile object so as not to enter into the personal space of the human. As a result, the mobile object does not unnecessarily interfere with the human's activity.

Specifically, the behavior control apparatus may further comprise a reading unit operable to read landmark information in which types and positions of landmarks are associated one-to-one with each other, wherein the state estimation unit may specify a landmark that exists within sight of the human based on the landmark information, and perform the estimation based on a type of the specified landmark, the sight being determined based on the orientation of the human, and the setting unit may set the exclusive area based on a position of the specified landmark and the position of the human. Also, the setting unit may set, as the exclusive area, an area that is surrounded by one or more points that are based on the position of the landmark and one or more points that are based on the position of the human.

With the stated structure, it is possible to prevent the mobile object from unnecessarily interfering with the human's activity that involves use of a landmark (such as watching TV).

In this structure, the reading unit may further read state information showing states of the landmarks, and the state estimation unit may perform the estimation based on the type of the specified landmark and a state of the specified landmark shown by the state information.

With the stated structure, since the human's behavior is estimated in consideration of the landmark, it is possible to more precisely estimate the human's behavior.

Also, the acquiring unit may further acquire a posture of the human, and the state estimation unit may perform the estimation based on the type of the specified landmark and the posture of the human. Also, the state estimation unit may perform the estimation based on the type of the specified landmark and a change of the posture of the human.

With the stated structure, since the human's behavior is estimated in consideration of the posture of the human, it is possible to more precisely estimate the human's behavior that involves a change of the posture.

The acquiring unit may acquire a position and an orientation of a first human and a position and an orientation of a second human, the state estimation unit may estimate whether one of the patterns as a behavior of the first human shows communication with the second human, based on the position and the orientation of the first human and the position and the orientation of the second human, and if the state estimation unit estimates affirmatively, the setting unit may set the exclusive area based on the position and the orientation of the first human and the position and the orientation of the second human. Also, the state estimation unit may estimate whether one of the patterns estimated as a behavior of the first human shows communication with the second human, based on whether the second human exists within sight of the first human, the sight being determined based on the orientation of the first human.

With the stated structure, the behavior control apparatus is capable of estimating whether the first human is communicating with the second human. As a result, it is possible to prevent the mobile object from unnecessarily interfering with the communication.

In this structure, the communication may be in a form of a conversation including the use of a voice, and the acquiring unit may include a voice acquiring unit operable to acquire a voice. The state estimation unit may include a voice judging unit operable to judge whether a human utters a voice, based on the acquired voice, and the state estimation unit may estimate whether the one of the patterns estimated as the behavior of the first human shows the conversation with the second human, based on the position of the first human and the position of the second human and whether the first human and the second human utter a voice.

With the stated structure, the state estimation unit judges whether the humans have a conversation based on whether the humans utter a voice. As a result, it is possible to more precisely estimate whether the humans have a conversation.

The communication may be in a form of a gesture.

Also, the judging unit may include an importance level judging unit operable to judge, when an event that requires notification of information to the human occurs, whether the pattern that has been estimated by the state estimation unit allows the notification, based on an importance level of the event, and the judging unit may judge affirmatively if the importance level judging unit judges affirmatively.

With the stated structure, the mobile object notifies the human of the information if an important event occurs, and if the event is not very important, the mobile object does not interfere with the human's activity. Also, for example, it is possible to judge whether to inform the information to the user according to what the activity is. If this is the case, the mobile object notifies the human of various types of information if it is acceptable that the human's activity will be interrupted by the mobile object, and if the human is concentrating on a certain activity for example, notifies only urgent information so as not to interfere with the human.

If the judging unit judges affirmatively, the behavior determination unit may control the movement mechanism of the mobile object such that the mobile object moves to a position that is out of the exclusive area and within a task executable area which allows the mobile object existing therein to notify the user of the information.

With the stated structure, if there is information to be notified to the human, the mobile object notifies the human of the information while avoiding frequent interference with the human.

The mobile object may present information to the user by an information presentation mechanism, the setting unit may include a state estimation unit operable to estimate which of prescribed patterns shows a behavior of the human, and if the judging unit judges affirmatively, the behavior determination unit may determine a method by which the information is to be presented by the information presentation mechanism, according to the pattern that has been estimated by the state estimation unit, and control the information presentation mechanism so as to present the information by the determined manner.

With the stated structure, the mobile object can present information to the user in a manner that is appropriate for the user's state. In other words, it is possible to increase the probability that the user recognizes the information. For example, if it is not effective that the information is visually given to the user (e.g. the user is concentrated on reading), the mobile object can effectively present the information in another way, such as by using sounds.

The setting unit may include a state estimation unit operable to estimate which of the prescribed patterns shows a behavior of the human, and the behavior determination unit may determine a travel route of the mobile object according to a pattern that has been estimated by the state estimation unit as showing the behavior of the human.

With the stated structure, it is possible to move the mobile object closer to or away from the user, according to the user's state. In other words, it is possible to make the mobile object emotionally expressive without unnecessarily interfering with the user's activity. For example, the mobile object may be controlled to discreetly or intrusively get close to the user.

The setting unit may determine the shape of the exclusive area according to the sex of the human.

The setting unit may determine the shape of the exclusive area according to social relationship between the human and another human existing within sight of the human or the mobile object existing within the sight of the human, the sight being determined based on the orientation of the human.

The setting unit may determine the shape of the exclusive area according to an orientation of another human existing within sight of the human or an orientation of the mobile object existing within the sight of the human, the sight being determined based on the orientation of the human.

The setting unit may determine the shape of the exclusive area according to a moving direction of another human existing within sight of the human or a moving direction of the mobile object existing within the sight of the human, the sight being determined based on the orientation of the human.

The present invention also provides a mobile object that has a movement mechanism and includes a behavior control apparatus, the behavior control apparatus comprising: an acquiring unit operable to acquire a position and an orientation of at least one human; a setting unit operable to determine a shape of an exclusive area for the human according to the acquired orientation, and set the exclusive area having the shape for the human with reference to the acquired position; a judging unit operable to judge whether any information is to be notified to the human by the mobile object; and a behavior determination unit operable, if the judging unit judges negatively, to control the movement mechanism of the mobile object such that the mobile object moves out of the exclusive area.

The present invention also provides a behavior control method for controlling behavior of a mobile object having a movement mechanism, the behavior control method comprising: an acquiring step of acquiring a position and an orientation of at least one human; a setting unit of determining a shape of an exclusive area for the human according to the acquired orientation, and set the exclusive area having the shape for the human with reference to the acquired position; a judging unit of judging whether any information is to be notified to the human by the mobile object; and a behavior determination step of, if the judging unit judges negatively, controlling the movement mechanism of the mobile object such that the mobile object moves out of the exclusive area.

The present invention also provides a computer-readable recording medium on which is recorded a computer program for instructing a behavior control apparatus to execute operations thereof for controlling behavior of a mobile object having a movement mechanism, the computer program comprising: an acquiring step of acquiring a position and an orientation of at least one human; a setting unit of determining a shape of an exclusive area for the human according to the acquired orientation, and set the exclusive area having the shape for the human with reference to the acquired position; a judging unit of judging whether any information is to be notified to the human by the mobile object; and a behavior determination step of, if the judging unit judges negatively, controlling the movement mechanism of the mobile object such that the mobile object moves out of the exclusive area.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows user attribute information 110;

FIG. 5A shows map information 130;

FIG. 5B shows landmark information 140;

FIG. 5C shows landmark information 150;

FIG. 6 shows a judgment condition table 160 used for estimating a user's state;

FIG. 19 shows changes of the size of the personal space defined in social psychology; and FIG. 20 shows example settings of an extended personal space.

DETAILED DESCRIPTION OF THE INVENTION

The following describes a behavior control apparatus pertaining to the present invention, with reference to the drawings.

1. Outline

A behavior control apparatus 11 of the present invention controls behavior of a mobile object. In the following explanations, the mobile object is assumed to be a robot 1. In the following explanations, the behavior control apparatus 11 is assumed to be installed in the robot 1. However, the present invention is not limited to this. The behavior control apparatus 11 may use a communication means, such as wireless communication, to instruct the robot 1.

2. Structure

Figure 1:
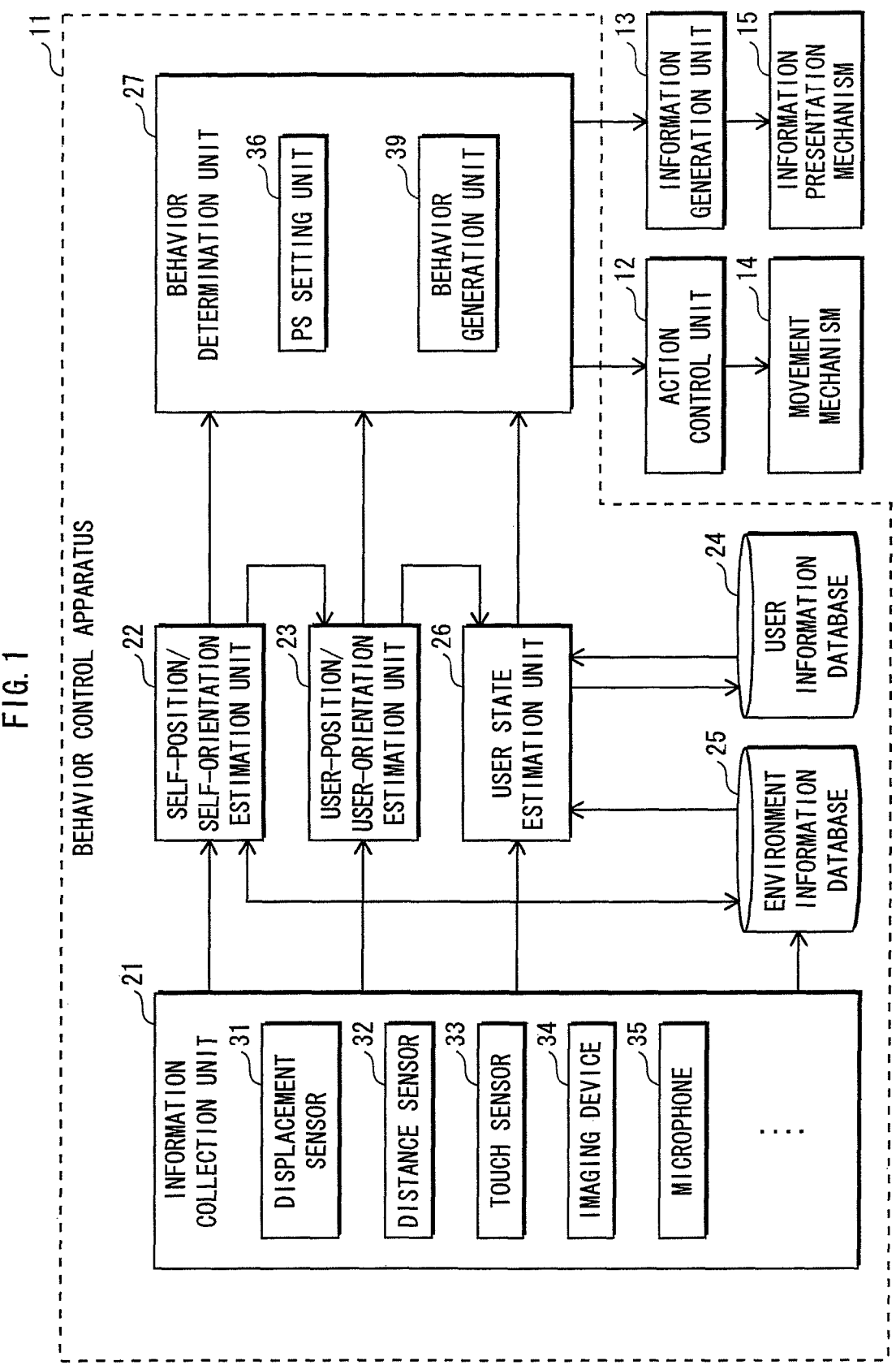
FIG. 1 is a functional block diagram showing the structure of a robot 1 of the present invention.

FIG. 1 is a functional block diagram showing the structure of the robot 1 of the present invention.

The robot 1 includes the behavior control apparatus 11, an action control unit 12, an information generation unit 13, a movement mechanism 14, and an information presentation mechanism 15.

The behavior control apparatus 11 determines a way in which the robot 1 represents information, a travel route of the robot 1 and so on according to environmental changes around the robot 1. The behavior control apparatus 11 instructs the information presentation mechanism 15, the movement mechanism 14 and so on to represent information or move the robot 1.

The action control unit 12 controls the movement mechanism 14 to move the robot 1 according to the travel route output by the behavior control apparatus 11.

The information generation unit 13 controls the information presentation mechanism 15 to present information according to the way of the information presentation output by the behavior control apparatus 11.

The movement mechanism 14 is a mechanism for moving the robot 1. Examples of the movement mechanism 14 are wheels, legs, crawlers, and so on.

The information presentation mechanism 15 is a mechanism for presenting information. Using the information presentation mechanism 15, the robot 1 presents information to the users. The information to be presented to the users includes, for example, occurrences of prescribed events, details of the events (e.g. a family member has come home), emotions of the robot 1, and so on.

The information presentation mechanism 15 is, specifically, a display, a light emitting device such as an LED (Light Emitting Diode), a speaker, a part of the robot 1, and so on. For example, a display presents text information and image information. Light emitting devices such as LEDs generate information by combinations of blinks or light-up timings thereof. A speaker outputs sound information. Also, a part of the robot 12 may be moved to give gestures and present information in haptical manner, such as by pushing and stroking.

The following describes the behavior control apparatus 11 in detail.

As FIG. 1 shows, the behavior control apparatus 11 includes an information collection unit 21, a self-position/self-orientation estimation unit 22, a user-position/user-orientation estimation unit 23, a user information database 24, an environment information database 25, a user state estimation unit 26, and a behavior determination unit 27.

2.1 Information Collection Unit 21

The information collection unit 21 includes a various kinds of sensors and so on. Using these sensors and so on, the information collection unit 21 collects information of the robot 1 and the environment around the robot 1. Specifically, the information collection unit 21 includes a displacement sensor 31, a distance sensor 32, a touch sensor 33, an imaging device 34, a microphone 35, and so on.

The displacement sensor 31 is for monitoring actions of the robot 1. The displacement sensor 31 is structured from a potentiometer, for example.

The distant sensor 32 measures the distance between the robot 1 and an object. The distant sensor 32 is structured from an ultrasonic sensor, an infrared sensor, or a laser-type distance sensor, for example.

The touch sensor 33 detects pressure physically applied by the user, such as stroking and hitting, and outputs the detection results.

The imaging device 34 is a device for imaging surroundings of the robot 1. The imaging device 34 is structured from an image sensor, such as a CCD (Charge Coupled Device) or a CMOS (Complementary metal Oxide Semiconductor).

The microphone 35 converts sounds around the robot 1 to electrical signals, and outputs the signals as sound information.

It should be noted here that each of the sensors is not essential, and provided for the information collection unit 21 according to need. For example, although the touch sensor 33 is provided in the example above, the touch sensor 33 is not essential if it is merely auxiliary measuring equipment.

Also note that each sensor included in the information collection unit 21 and the information presentation mechanism 15 are not necessarily mounted on the robot 1. The robot 1 may use sensors and information presentation apparatus existing in the environment around the robot 1. For example, a floor pressure sensor may be used as a sensor existing in the environment.

2.2 Self-Position/Self-Orientation Estimation Unit 22

The self-position/self-orientation estimation unit 22 estimates the position and the orientation of the robot 1 based on pieces of information collected by the information collection unit 21.

Specifically, to estimate the position and the orientation of the robot 1, the self-position/self-orientation estimation unit 22 observes one or more landmarks located within the action space (e.g. user's residence) where the robot 1 exists. Landmarks are objects located within the action space of the robot 1, such as a TV set and windows existing in the residence, and the entrance of the residence.

The following are supplemental explanations of the action space of the robot 1, the landmarks, and the position and the orientation of the robot 1.

(i) The following explains a reference position for determining the position and the orientation of the robot 1.

Figure 2:
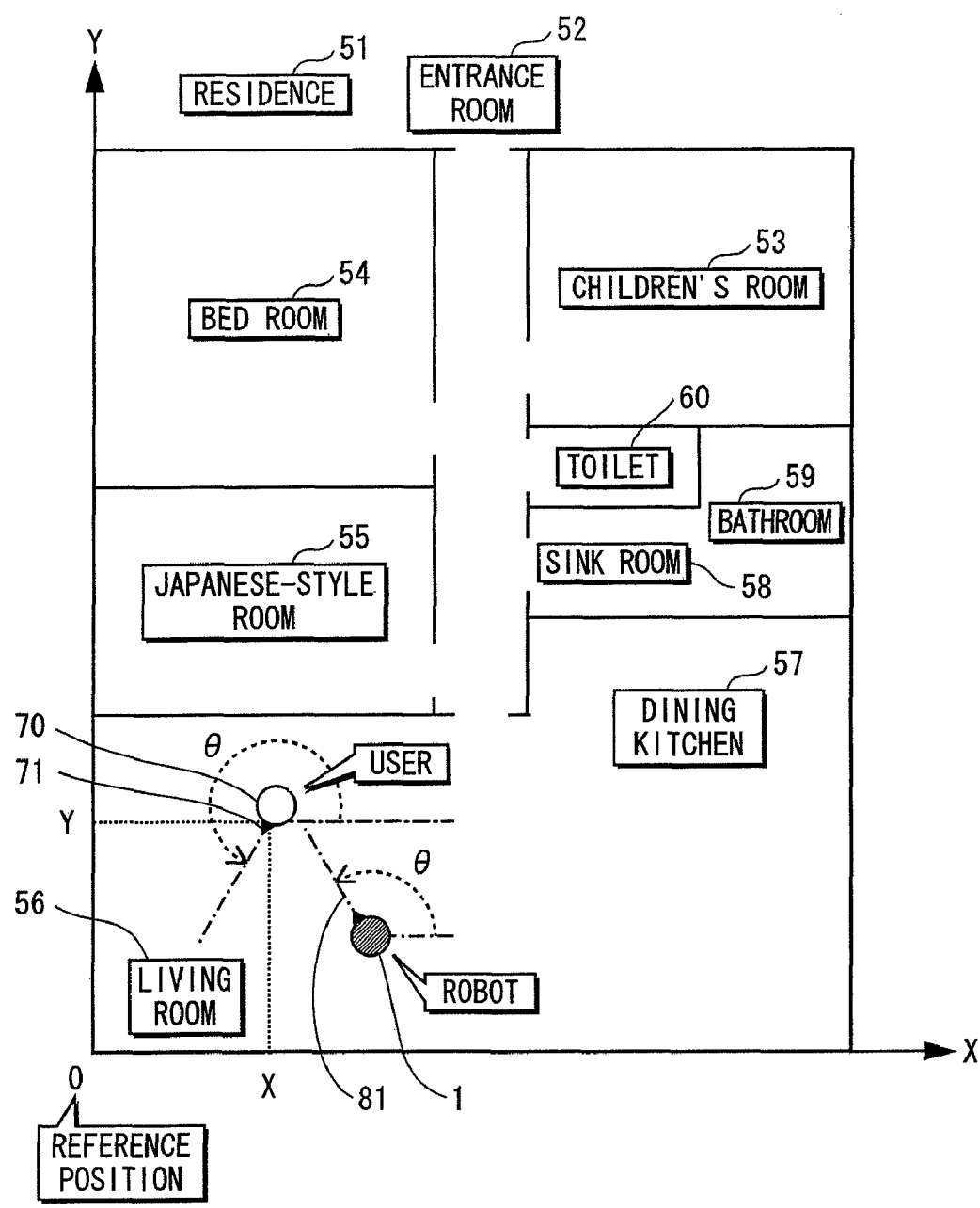
FIG. 2 shows an example of an action space of the robot 1.

FIG. 2 shows an example of the action space of the robot 1.

FIG. 2 assumes that a user's residence is the action space. A residence 51 includes an entrance room 52, a children's room 53, a bed room 54, a Japanese-style room 55, a living room 56, a dining kitchen 57, a sink room 58, a bathroom 59, and a toilet 60.

As FIG. 2 shows, a user 70 and the robot 1 exist in the action space. As FIG. 2 shows, a prescribed position within the residence is defined as a reference position. The position of the robot 1 within the action space is represented by coordinate values (X, Y) with respect to the reference position. The orientation 81 of the robot 1 is represented by an angle θ between the front side of the robot 1 and the X axis, measured in a counterclockwise direction.

In the same manner, the position of each existing landmark, such as the TV set, is represented by coordinate values with respect to the reference position, and the orientation of each landmark is represented by an angle θ between the front side of the landmark and the X axis, measured in the counterclockwise direction. This applies to the position and the orientation 71 of the user 70 as well.

Here, note that the orientations of the landmarks are set for each landmark. For example, the orientation of the TV set is represented by the angle between the X axis and the normal line of the display screen that displays images. The landmark information that shows the positions and the orientations of the landmarks is stored in the environment information database 25, which is described later.

(ii) The following explains estimation of the position and the orientation of the robot 1.

The self-position/self-orientation estimation unit 22 extracts a landmark from an image that has been captured by the imaging device 34 using image-recognition technique or the like, and estimates the position and the orientation of the landmark with respect to the robot 1 (i.e. the position and the orientation of the landmark viewed from the robot 1) based on the size and the orientation of the landmark in the image. The method for calculating a distance to an object and so on by detecting the size and the orientation of the object captured in the image has been used broadly as an image-recognition technique. Therefore, detailed explanations thereof are omitted here.

Since the positions and the orientations of the landmarks with respect to the reference position are stored in the environment information database 25, the self-position/self-orientation estimation unit 22 performs calculations such as vector synthesizing using the estimated position and orientation and the coordinate values of the landmarks stored in the environment information database 25 to estimate the position and the orientation of the robot 1 with respect to the robot 1 at the time the image was captured. Regarding other than the time the image was captured, the self-position/self-orientation estimation unit 22 estimates the position and the orientation of the robot 1 using the output result from the displacement sensor 31.

(iii) The following explains updating of the landmark information.

The landmarks, such as a TV set and an umbrella stand can be moved to different positions. Accordingly, if the positions of any of the landmarks in the action space of the robot 1 are changed, the self-position/self-orientation estimation unit 22 updates the landmark information stored in the environment information database 25.

If positions of some of the landmarks can be changed, the self-position/self-orientation estimation unit 22 estimates the position and the orientation of the robot 1 with reference to others of the landmarks that are less likely to be moved, such as the windows. After that, the self-position/self-orientation estimation unit 22 calculates the positions and the orientations of the landmarks that can be moved, based on the position and the orientation of the robot 1. If the positions and the orientations of such landmarks are changed, the self-position/self-orientation estimation unit 22 updates the environment information database 25.

2.3 User-Position/User-Orientation Estimation Unit 23

The user-position/user-orientation estimation unit 23 estimates the position and the orientation of the user, based on various kinds of information collected by the information collection unit 21 and the position and the orientation of the robot 1 estimated by the self-position/self-orientation estimation unit 22. The position of the user mentioned above represents coordinates included within the action space of the robot 1. The orientation of the user represents the direction that the user's body faces. Orientation of the face, the line of sight, the shoulders, the feet, the trunk or the like may be used as the orientation of the user.

In summary, (i) the user-position/user-orientation estimation unit 23 first recognizes a user as target of estimation of the position and the orientation. Next, (ii) the user-position/user-orientation estimation unit 23 specifies the position of the user viewed from the robot 1. Finally, (iii) the user-position/user-orientation estimation unit 23 estimates the position and the orientation of the user using the position and the orientation of the robot 1.

(i) The following describes the recognition of the user. Specifically, the user-position/user-orientation estimation unit 23 extracts the user from an image that has been captured by the imaging device 34 using image-recognition technique. To extract the user from the image, for example, the user-position/user-orientation estimation unit 23 stores a series of image frames captured by the imaging device 34, performs pattern matching by comparing the image frame that is the newest in terms of time with old image frames, and calculates a displacement value of each pixel. If displacement values of any of the pixels are greater than the others, it can be assumed that the user is included in the pixels.

(ii) The following describes the specification of the position of the user viewed from the robot 1. From the extracted user image, the user-position/user-orientation estimation unit 23 extracts an area having a skin color, and estimates the orientation of the user's face based on the size and the shape of the area. Also, the user-position/user-orientation estimation unit 23 estimates the position of the user with reference to the robot 1, based on the size and the shape of the extracted user image in the captured image. The user's position with reference to the robot 1 may be estimated by the distance sensor 32. In this way, the user-position/user-orientation estimation unit 23 can estimate the position and the orientation of the user with reference to the robot 1.

(iii) The following explains the estimation of the position and the orientation of the user. The position and the orientation of the user estimated in the above-stated manner are those viewed from the robot 1, and not those with respect to the reference position of the action space of the robot 1. Accordingly, the user-position/user-orientation estimation unit 23 estimates the position and the orientation of the user with respect to the reference position by performing vector synthesizing between the position and the orientation (relative position and orientation) estimated above and the position and the orientation of the robot 1 within the action space of the robot 1, estimated by the self-position/self-orientation estimation unit 22.

Note that the self-position/self-orientation estimation unit 22 and the user-position/user-orientation estimation unit 23 may perform the estimation based on output values from the above-mentioned floor pressure sensor. If this is the case, the orientation of the user can be estimated based on the orientation of the feet of the user.

2.4 User Information Database 24

The user information database 24 stores therein information of the user. Specifically, the user information database 24 stores user attribute information that shows attributes of the users, and action history information that shows history of actions of each user. As described later, the user attribute information is used by the user state estimation unit 26 and the behavior determination unit 27, and so on. The action history information is used for updating the user attribute information, for example.

The following describes the user attribute information and the action history information in detail.

2.4.1 User Attribute Information 110

FIG. 3 shows user attribute information 110.

As FIG. 3 shows, the user attribute information 110 includes, for each user, a name 111 which shows the user's name, an ID 112 for identifying the user, a status 113 which shows a relationship between the user and the robot, a use duration 114 which shows how long the user has been using the robot, a basic attribute 115 which shows basic information of the user, a hobby 116 which shows a hobby of the user, a preference 117 which shows a the user's preference. These items are associated with each other.

If the status 113 is "owner", the user is the owner of the robot 1. If the status 113 is "guest", the user is not the owner of the robot 1, but recognized by the robot 1. The use duration 114 in this embodiment shows the number of days that has elapsed since the robot 1 first recognized the user. The preference 117 may include information relating to the hobby 116. For example, if the hobby 116 shows "movies", the preference 117 may include the type of movies that the user prefers (e.g. SF movies).

Any method can be used to add records to the user attribute information 110. Each record of the user attribute information 110 may be input by a user. Alternatively, information transmitted by each user may be added to the user attribute information 110. For example, to add record to the user attribute information 110, the behavior control apparatus 11 may read information from an IC tag that stores user's information, or receive information transmitted from a user's portable apparatus.

2.4.2 Action History Information 120

Figure 4:
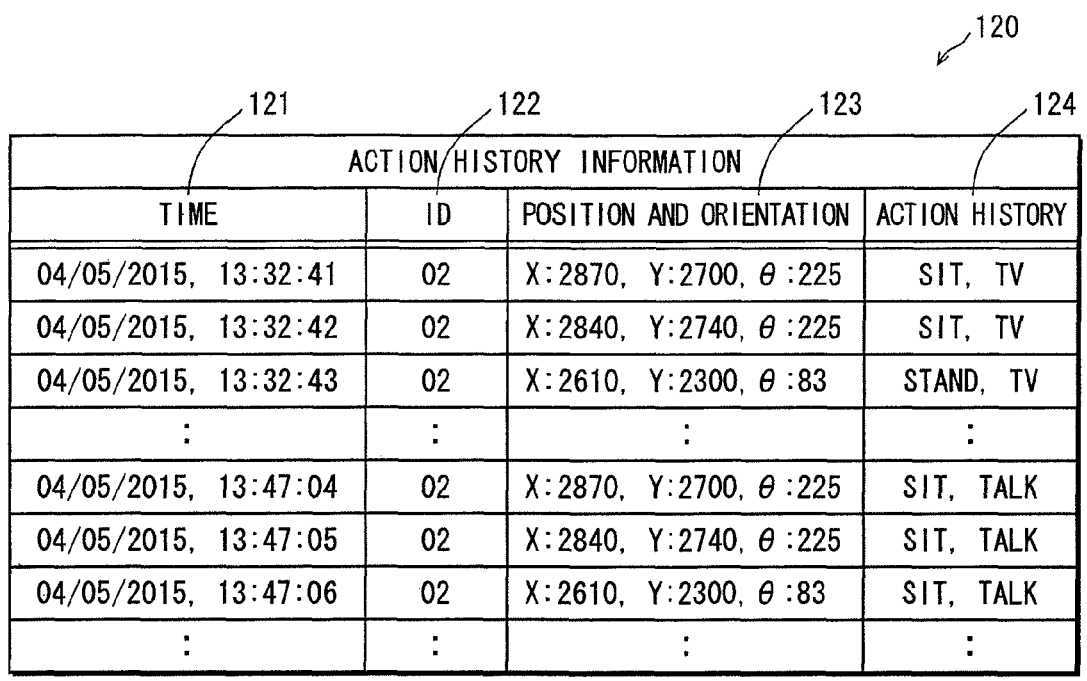
FIG. 4 shows action history information 120.

FIG. 4 shows the action history information 120.

As FIG. 4 shows, the action history information 120 includes records each including a time, an ID 122 for identifying a user as a target of recording the action history, a position and orientation 123 which shows a position and an orientation of the user, and an action history 124 which shows actions of the user. These items are associated with each other.

Note that the values of the ID 122 shown in FIG. 4 correspond to the values of the ID 112 of the user attribute information 100 shown in FIG. 3. For example, FIG. 4 shows the action history of a user whose ID 122 is "02". As FIG. 3 shows, the name of this user is "Matsushita Hanako". In other words, FIG. 4 shows the action history of the user "Matsushita Hanako".

The position and orientation 123 indicates X and Y coordinates with respect to the reference position, and orientation of the user with reference to the X axis, as FIG. 2 shows. The position and the orientation of the user is estimated by the user-position/user-orientation estimation unit 23.

The action history 124 indicates, for example, whether the user was sitting (SIT) or standing (STAND), the user's action (TV (watching TV), TALK (Having a talk), etc), and so on.

In this embodiment, the action history information 120 is assumed to be updated based on the state of the user estimated by the user state estimation unit 26. For example, if the user state estimation unit 26 estimates that the user is "watching TV", "TV" will be recorded in the action history 124. Whether the user is sitting (SIT) or standing (STAND) is judged by image recognition or the like.

Alternatively, the action history information 120 may be updated as needed based on information collected by the information collection unit 21. In other words, the behavior control apparatus 11 judges an action of the user based on the information collected by the information collection unit 21, and records the action as needed into the action history 124.

For example, the behavior control apparatus 11 judges whether the user in the image captured by the imaging device 34 is sitting or standing by image recognition, and records the judgment result into the action history 124.

Also, the behavior control apparatus 11 records a user action determined by an object that exists in the direction that the user faces (e.g. landmarks, humans and robots to which the user pays attention). For example, if the user faces the TV, the behavior control apparatus 11 records "TV" in the action history 124. Here, the behavior control apparatus 11 may record "TV" in the action history 124 only when the TV is ON. Also, for example, when another user or robot exists around the user and the microphone detects that the user's voice, the behavior control apparatus 11 records "TALK" into the action history 124.

2.5 Environment Information Database 25

The environment information database 25 stores therein map information that shows a map of the action space in which the robot 1 travels. Since the user's residence is defined as the action space in this embodiment, the map information shows the layout of the user's residence, that is, positions of the rooms in the residence.

FIG. 5A shows the map information 130.

The map information 130 includes, for each room, a name 131 which shows the name of the room, and the position 132 which shows the position of the room. These items are associated with each other. For example, the entrance room 52 of FIG. 2 is represented in the map information of FIG. 5A by four pairs of coordinates (X:3500, Y:8050, X:4500, Y:8050, X:4500, Y9050, X3500: Y:9050). The position of each room is represented as an area formed by connecting the coordinates. For example, the entrance room 52 is represented as an area formed by connecting the coordinates (X:3500, Y:8050) to the coordinates (X:4500, Y:8050), connecting the coordinates (X:4500, Y:8050) to the coordinates (X:4500, Y:9050), and then connecting the coordinates (X:4500, Y:9050) to the coordinates (X3500: Y:9050), and finally connecting the coordinates (X3500: Y:9050) to the coordinates (X:3500, Y:9050). The same applies to the living room 56 and so on.

Meanwhile, as described above, the landmarks are located in each room. For example, a TV set is located in the living room 56. It is the landmark information 140 shown in FIG. 5B and the landmark information 150 shown in FIG. 5C that shows the positions and the orientations of the landmarks. For each room, landmark information is stored in the environment information database 25.

Specifically, FIG. 5B is the landmark information 140 that shows the landmarks located in the entrance room 52. As FIG. 5B shows, an umbrella stand is located as a landmark in the entrance room 52. The name of the landmark is shown in a name 141, and the position and the orientation of the landmark is shown in a position and orientation 142. FIG. 5C is the landmark information 150 that shows the landmarks located in the living room 56. In the same manner as FIG. 5B, the name of the landmark is shown in a name 151, and the position and the orientation of the landmark is shown in a position and orientation 152.

2.6 User State Estimation Unit 26

The user state estimation unit 26 estimates the state of the user. In other words, the user state estimation unit 26 estimates what action the user is taking. Specifically, the user state estimation unit 26 estimates the user's state based on the user's orientation estimated by the user-position/user-orientation estimation unit 23, the positions of the landmarks stored in the environment information database 25, and so on.

2.6.1 Patterns of User's State

In this embodiment, the user state estimation unit 26 judges which of prescribed patterns shown in FIG. 6 is taken by the user. The result of this judgment is the user's state. FIG. 6 is a judgment condition table 160 used for estimating the user's state. This judgment condition table 160 is stored in the user state estimation unit 26, for example.

The following explains the judgment condition table 160.

Each record of the judgment condition table 160 includes a user state 161, an object-in-sight 162, a distance 163 to the object, the object state 164, and the user action 165.

The user state 161 shows a name of each pattern.

The object-in-sight 162 shows an object in sight of the user. Here, the object is a landmark, a human, a robot, and so on that the user pays attention to.

The distance 163 shows conditions relating to the distance from the user to the object shown in the object-in-sight 162. For example, "300 or less, decrease" shown in FIG. 6 means that the distance from the user to the object is 300 (e.g. mm) or less, and the distance gradually decreases.

The object state 164 shows conditions relating to the state of the object. Here, the state of the object is, for example, actions and usages of the object, such as whether the driving power is supplied to the object, whether the object is broken, whether the object is deformed, and so on. For example, regarding the object "TV" in FIG. 6, the condition for the state of the object is that the power of the TV is "ON".

The user action 165 shows conditions relating to the user's action. The conditions relate to, for example, physical actions of the user, such as the user's posture (i.e. whether the user is sitting, standing, or lying) and whether or not the user is giving a sound or a voice. In the example of FIG. 6, "SIT" shows that the user is sitting. "STAND" shows that the user is standing. "SIT>STAND" shows that the user's posture has moved from the state of sitting (SIT) to the state of standing (STAND). In other words, "SIT>STAND" means that the user has stood up. "VOICE" means that the user has uttered a voice.

Watching TV

The following describes the pattern "WATCHING TV" as an example.

Figure 7:
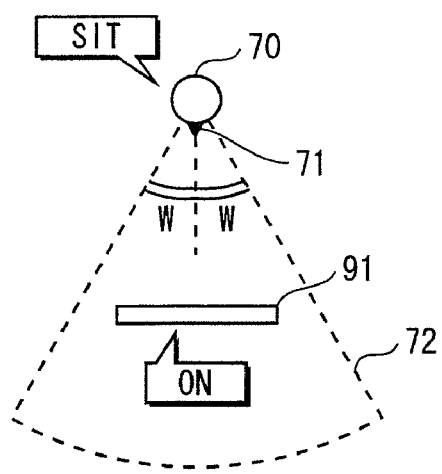
FIG. 7 shows an example of a user's sight 72.

As FIG. 7 shows, the user's sight 72 is determined based on the position 70 of the user and the orientation 71 of the user. FIG. 7 shows an example of the user's sight 72. For example, an area that the user pays attention to is determined as the user's sight 72. This area may be different from the actual sight of the user in size.

Since the position of the user, the orientation of the user, the positions of the landmarks and the position of the robot 1 are known, the user state estimation unit 26 can estimate what objects are included in the user's sight 72.

As FIG. 7 shows, in the case where the user's sight 72 includes a TV set 91 (c.f. the object-in-sight 162), the distance between the user 70 and the TV set 91 is not more than 300 (c.f. the distance 163), the power of the TV set 91 is "ON" (c.f. the object state 164), and the user is sitting (c.f. the user action 165), the user state estimation unit 26 estimates that the action pattern being taken by the user is "WATCHING TV".

In the example described above, only when all the conditions, namely the object-in-sight 162, the distance 163, the object state 164 and the user action 165 are satisfied, the user state estimation unit 26 judges that the pattern shown in the user state 161 is to be determined as the user's state. However, the user state estimation unit 26 may judge that the pattern shown in the user state 161 is to be determined as the user's state when only some of the conditions are satisfied. For example, in the case of "WATCHING TV", the user action 165 may be ignored.

Start Moving to Door

The following describes the case where the user state estimation unit 26 estimates that the user, who has been watching TV, stands up and starts moving to the door. This is shown in FIG. 6 as "START MOVING".

Figure 8:
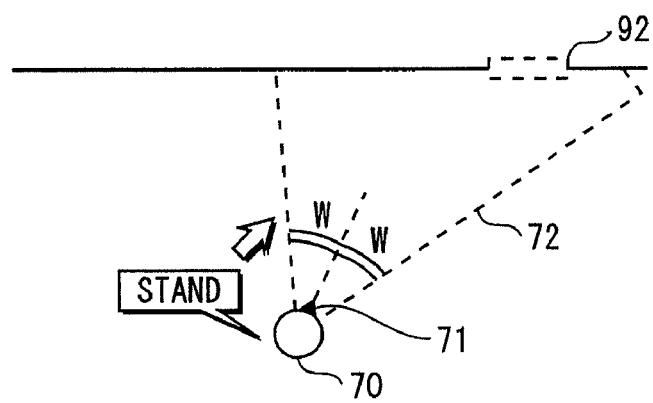
FIG. 8 shows a user who moves toward a door.

FIG. 8 shows the user moving toward the door.

As FIG. 8 shows, if the user stands up (SIT>STAND) and turns to the door 92 and the distance between the user and the door 92 decreases gradually, the user state estimation unit 26 estimates that the user will "START MOVING" to the door.

Also in this case, in the same manner as described in the case of "WATCHING TV", the user state estimation unit 26 may judge that the "START MOVING" is the user's state even when only some of the conditions shown in the judgment condition table 160 are satisfied.

Note that the judgment condition table 160 may be different for each user. In other words, the conditions to be used for determining the user's state may be different for each user. In the case of using different judgment condition table 160 for each user, the judgment condition table 160 may be configured with reference to the user attribute information 110. For example, if the hobby 116 of the user attribute information 110 shows "READING", a condition relating to the landmark "bookshelf" may be added to the judgment condition table 160 of the corresponding user. In the same manner, if the hobby of the user attribute information 110 shows "MOVIE", a condition relating to the landmark "TV" may be added to the judgment condition table 160 of the corresponding user.

2.6.2 User State Estimation Based on Action History Information 120

A certain action is often followed by another certain action. For example, if a user watching TV stands up, the user often moves to the door or the refrigerator. In this way, when a user is taking a certain action, this action will be highly possibly followed by a prescribed second action.

Such a tendency of the user's action may be prestored in the user information database 24, or obtained with reference to the action history information 120. With consideration of the tendency of the user's action, the user state estimation unit 26 may estimate that the user will take the second action after completing the first action. For example, if the user sitting and watching TV stands up, the user state estimation unit 26 may judges that the user will finish or suspend watching TV and move to a prescribed position.

2.6.3 Intention Estimation Unit and Emotion Estimation Unit

The user state estimation unit 26 includes an intention estimation unit and an emotion estimation unit. It is possible to more accurately estimate the user's state by using the intention estimation unit to estimate the user's intention, in addition to the user's current state. Also, it is possible to further improve the accuracy by using the emotion estimation unit to estimate the user's emotion.

Note that the technique to estimate the user's emotion has been used conventionally. For example, the user's emotion may be estimated based on meanings of characters generated by converting the user's voice. Alternatively, the user's emotion may be estimated based on the volume and the tone of the user's voice. Also, the user state 165 of the judgment condition table 160 may include a condition relating to the user's emotion.

2.7 Behavior Determination Unit 27

The behavior determination unit 27 determines behavior of the robot 1. Specifically, the behavior determination unit 27 determines whether the robot 1 is to be moved, to where the robot 1 is to be moved if to be moved, whether the robot 1 gives information to the user, and how the robot 1 gives information to the user if doing so.

The behavior determination unit 27 includes a PS setting unit 38 and a behavior generation unit 39.

2.7.1 PS Setting Unit 38

The PS setting unit 38 sets an exclusive area for each user. Here, the exclusive area is an area defined with reference to the position and the orientation of the user. Basically, the robot 1 should avoid entering the exclusive area.

Figure 9:
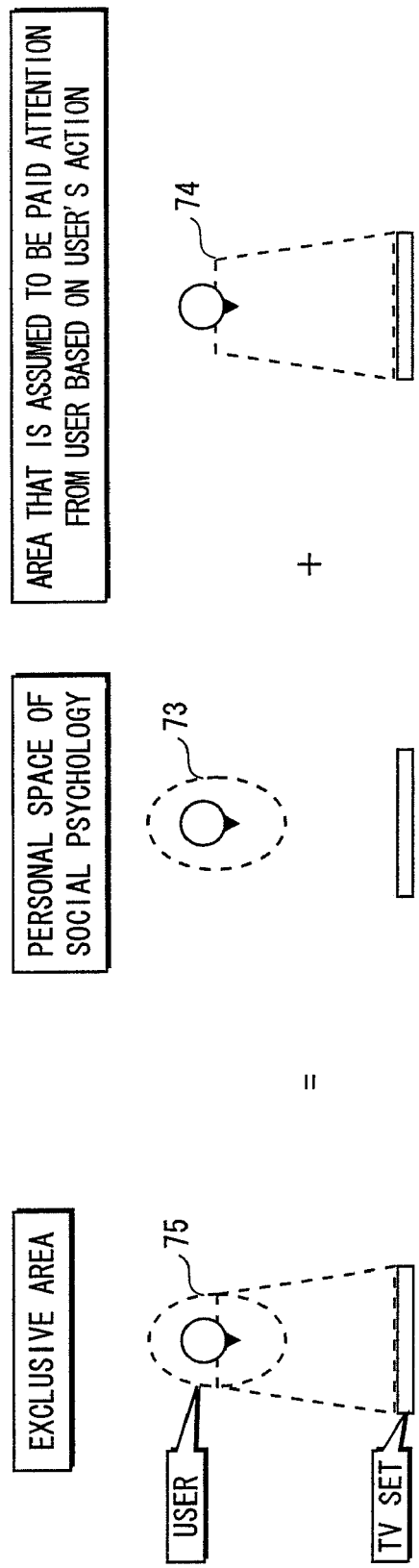
FIG. 9 shows an exclusive area.

FIG. 9 shows an exclusive area 75. As FIG. 9 shows, the exclusive area 75 is consisted of (i) a personal space defined in social psychology (personal space 73) and (ii) an area that is assumed to be paid attention from the user and determined according to the user's state (The area that is assumed to be paid attention from the user is hereinafter called an "extended personal space"). In FIG. 9, the area (ii) is referred to as an extended personal space 74.

The following supplementary explanation describes (i) the personal space defined in social psychology.

The personal space defined in social psychology is a concept advocated by psychologist Sommer. According to Sommer, the personal space is an invisible space owned by each of people who interact with each other (Reference 1: Sommer, R., Personal Space: The Behavioral basis of design, Prentice-Hall, 1969). Also, Hayduk defines the personal space as "a space that a person actively keeps around the person, and that others can not invade without making the person feel uncomfortable" (Reference 2: Hayduk, L., A Personal Space: An evaluative and orienting overview, Psychological Bulletin, 85, 117-134, 1978). The personal space is considered as a space in an elliptical or similar shape that surrounds each person.

Figure 10:
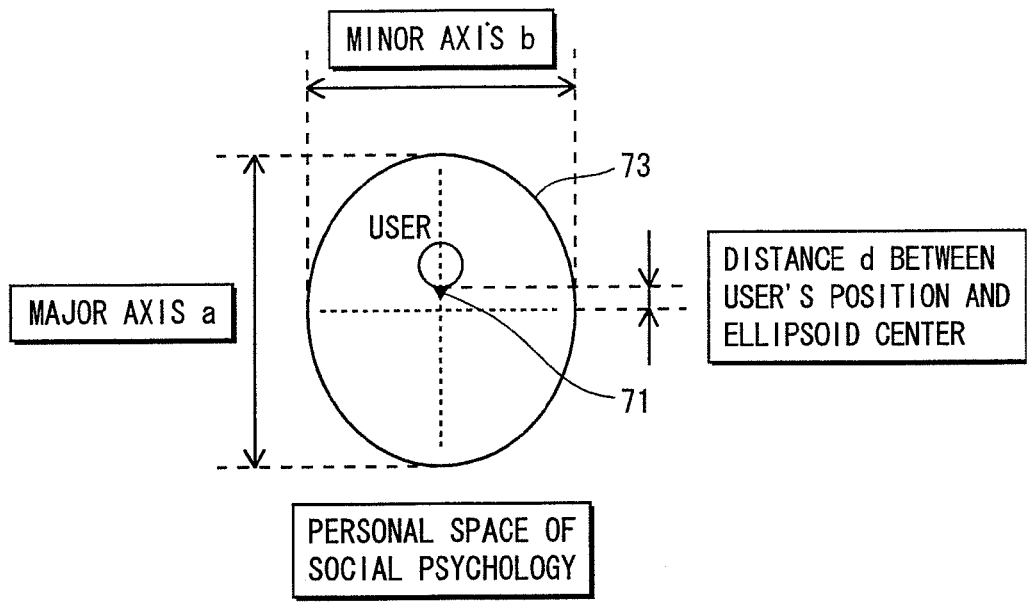
FIG. 10 shows a personal space defined in social psychology.

FIG. 10 shows the personal space defined in social psychology. In this embodiment, an ellipsoid defined by a major axis a, a minor axis b, and a distance d between the user's position and the ellipsoid center is adopted as the personal space 73 for determining the exclusive area as illustrated in FIG. 10. However, the space of the personal space 73 is not limited to the ellipsoidal shape, and it may be in another similar shape, such as an oval shape.

The following supplementary explanation describes (ii) the extended personal space.

The user's state is estimated by the user state estimation unit 26. It is possible to identify an object that is assumed to be paid attention from the user, based on the estimated user's state. For example, if the user's state is "WATCHING TV", it can be assumed that the object that the user pays attention to is the "TV set". In other words, the object that is in sight of the user and relates to the pattern determined as a result of the estimation by the user state estimation unit 26 is judged as being paid attention from the user.

Upon the identification of the object by the user state estimation unit 26, the PS setting unit 38 defines the extended personal space based on the position and the size of the object and the position and the orientation of the user.

Figure 11:
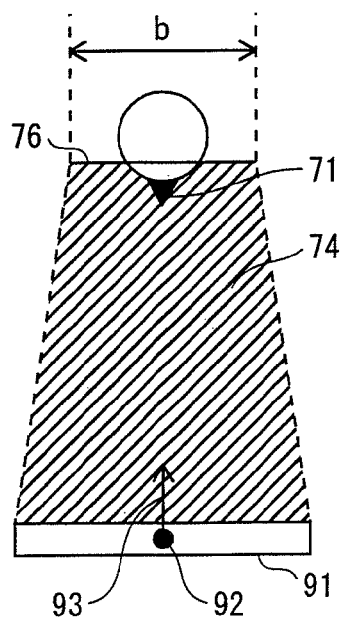
FIG. 11 shows an example of a space that is assumed to be drawing user's attention.

FIG. 11 shows an example of the space that is assumed to be drawing the user's attention.

In this embodiment, as FIG. 11 shows, the PS setting unit 38 extracts the minor axis 76 of the ellipsoidal personal space defined in social psychology. After that, the PS setting unit 38 extracts the object that is assumed to be drawing the user's attention. In FIG. 11, the object is the TV set 91. The PS setting unit 38 defines, as the extended personal space 74, an area surrounded by the both ends of the extracted minor axis 76 and the both end of the object (TV set 91). Here, the ends of the object can be determined in the following manner, for example: In the case of the landmark, the landmark information shows the position and the orientation of the landmark as described above. As FIG. 11 shows, the both ends of a line segment that is perpendicular to the orientation 93 of the landmark, includes the position 92 of the landmark as the center point, and has a prescribed length, is determined as the both ends of the object. It is preferable that the length of the line segment is predetermined for each landmark.

Note that the way to define the extended personal space is not limited to the above-described way that is based on the minor axis 76 and the both ends of the object. The extended personal space may be defined in another way. For example, extended personal space may be defined based on the major axis of the personal space defined in the social psychology and the object.

2.7.2 Behavior Generation Unit 39

The behavior generation unit 39 determines behavior of the robot 1, such as how the robot 1 should move, and how the robot 1 should give information to the user.

Specifically, the behavior generation unit 39 judges whether there is information to be given to the user, based on the user's state estimated by the user state estimation unit 26 and occurred events. The details are described later with an explanation of the operations. If there is no information to be given to the user, the behavior generation unit 39 determines a target position of the robot 1 such that the robot 1 will be out of the exclusive area defined by the PS setting unit 38, and determines a travel route to the target position. If there is any information to be given to the user, the behavior generation unit 39 determines the target position, the target orientation and the travel route of the robot 1 such that the robot 1 will moves into a task executable zone.

Here, the task executable zone is a zone in which the robot 1 can give information to the user. Basically, this is an area around the user. The task executable zone is determined based on how the robot 1 gives information to the user. For example, if the robot 1 visually gives information to the user (e.g. by blinks of the LED of the robot 1 or actions by the robot 1), the robot has to move to a position where is visible from the user. If the robot 1 gives information to the user by sound (e.g. by outputting sound from the speaker of the robot 1), the robot 1 has to move to a position where the user can easily hear the sound from the robot 1.

Upon determining the behavior of the robot 1, the behavior generation unit 39 informs the action control unit 12 and the information generation unit 13 of the behavior. The action control unit 12 controls the movement mechanism 14 according to the target position and orientation and the determined travel route. The information generating unit 13 generates information to be given to the user. The generated information will be output by the information presentation mechanism 15.

The behavior generation unit 39 may use the potential method known as prior art to determine the travel route. According to the potential method, a potential function is to be designed. The potential function represents an effect of gravity from the targeted position of the robot 1 and an effect of repulsion from obstacles. In other words, this method prepares a potential field in which a potential of the current position of the robot is high and the target position is low. In this potential field, a prescribed potential is added to only the obstacles such that the potential of areas occupied by the obstacles are higher than potentials of the robot's movable areas. A travel route from the current position to the target position, which avoids the obstacles, is generated by linking travel routes with the maximum potential slopes in the potential field. It is possible to determine a travel route with consideration of the exclusive area of the user by adding a prescribed potential to the exclusive area as well as to the obstacles areas.

3. Operations

The following explains operations of the robot 1.

The robot 1 collects information of the environment around the robot 1 according to need, using the information collection unit 21. The PS setting unit 38 of the robot 1 defines the exclusive area for each user, based on the information collected by the information collection unit 21. This operation for defining the exclusive area is explained later.

The behavior generation unit 39 of the robot 1 determines an action of the robot 1 with prescribed timing. This operation by the behavior generation unit 39 is explained later. Here, regarding the prescribed timing, the behavior generation unit 39 may determine the action cyclically, or determine it when the user's state estimated by the user state estimation unit includes any change, or when a prescribed event occurs.

A prescribed event is, for example, (i) an event relating to the action space of the robot 1, such as a visit of a guest and a telephone call. Or, the prescribed event is, for example, (ii) an event that occurs in an outer space that is irrelevant to the user, the robot 1, and the action space of the robot 1. This event is, for example, occurrence of important news, disaster such as an earthquake, and so on. Also, the prescribed event may be (iii) an event caused by communication by the user, the robot 1, and so on. For example, the event is caused by that the user talks to the robot 1 and the robot 1 responds to it, the robot 1 informs the user of the time, the robot 1 spontaneously displays its emotion using the information presentation mechanism 15, and so on.

3.1 Operations for Defining Exclusive Area

The following describes operations performed by the behavior control apparatus 11 for defining the exclusive area in detail.

Figure 12:
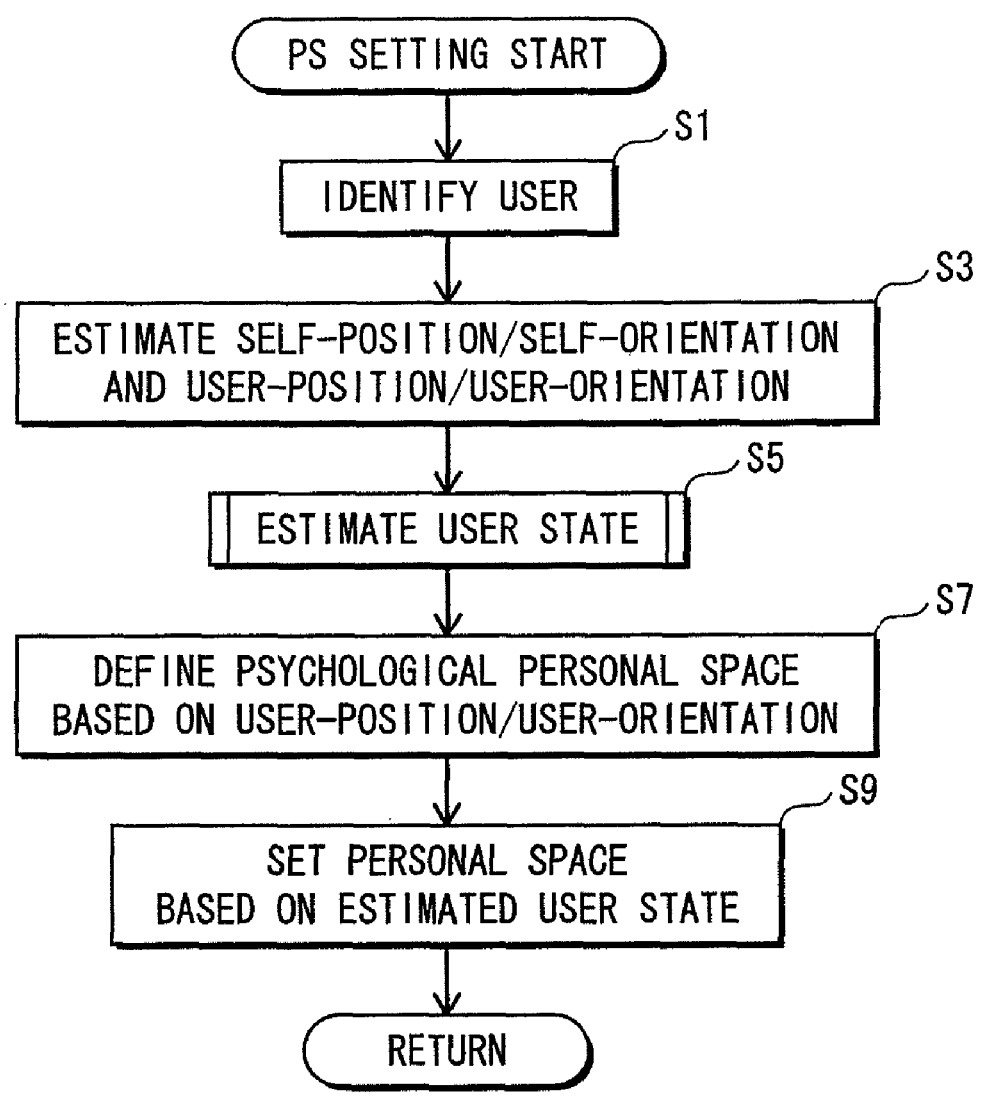
FIG. 12 is a flowchart schematically showing operations of a behavior determination unit 27.

FIG. 12 is a flowchart schematically showing operations for determining the exclusive area.

As FIG. 12 shows, the behavior control apparatus 11 identifies the user for whom the exclusive area is to be defined, based on the information collected by the information collection unit 21 (S1). As described in the explanation of the user-position/user-orientation estimation unit 23, the identification of the user may be performed by the image recognition, or by acquiring the user's voice and performing speaker recognition. For example, the behavior control apparatus 11 extracts the user's face from the image acquired by the imaging device 34 and performs matching with biological information stored in the user information database 24, such as an amount of characteristic of the user's face, to identify the user. If the matching fails, the behavior control apparatus 11 judges whether the user is a suspicious individual based on voice interaction and so on, and registers the user in the user information database 24 and stores the data such as the biological information in the user information database 24.

The behavior control apparatus 11 estimates the position and the orientation of the robot 1 using the self-position/self-orientation estimation unit 22 and the user-position/user-orientation estimation unit 23 (S3).

The behavior control apparatus 11 estimates the user's state using the user state estimation unit 26, based on the user's position and orientation (S5). This operation performed in Step S5 is explained in detail later.

The behavior control apparatus 11 defines a personal space defined in social psychology for the user identified as described above, using the PS setting unit 38 (S7).

Also, using the PS setting unit 38, the behavior control apparatus 11 defines an extended personal space for the identified user, based on the result of the estimation performed by the user state estimation unit 26 in Step S5 (S9). As described later, the user state estimation unit 26 may obtain a result showing that the user's state is "uncertain". If this is the case, the behavior control apparatus 11 does not define the extended personal space for the user in Step S9.

3.2 Detailed Explanations of Operations of the User State Estimation Unit 26

The following describes Step S5 in detail.

Figure 13:
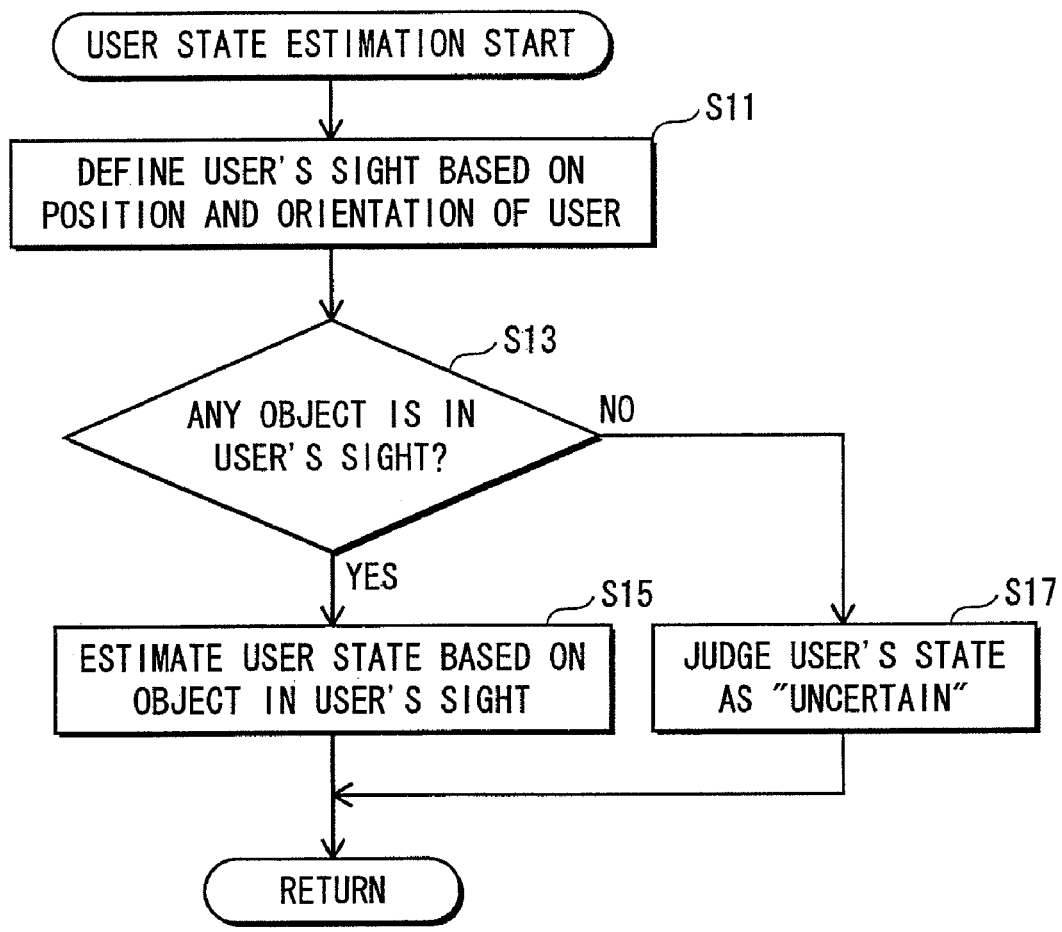
FIG. 13 is a flowchart showing details of operations of a user state estimation unit 26.

FIG. 13 is a flowchart showing details of the operations of the user state estimation unit 26.

As FIG. 13 shows, the user state estimation unit 26 defines a user's sight, based on the position and the orientation of the user whose exclusive area has been defined (S11). The user's sight is explained above with reference to FIG. 7.

The user state estimation unit 26 judges whether an object exists in the defined user's sight, with reference to the pieces of the landmark information stored in the environment information database and positions of the users estimated by the user-position/user-orientation estimation unit 23 (S13).

If judging that there is an object (S13: YES), the user state estimation unit 26 judges whether the positional relation between the object and the user matches with any of the patterns shown in the judgment condition table 160. If there is any patter that matches the condition, the user state estimation unit 26 judges that the pattern is the user's state. If there is no pattern that matches the condition, the user state estimation unit 26 judges that the user's state is "uncertain" (S15).

In Step S13, if judging that there is no object (S13: NO), the user state estimation unit 26 judges that the user's state is "uncertain" (S17).

In this way, the exclusive space is defined for each user.

3.3 Detailed Explanations of the Operations of Behavior Generation Unit 39

The following explains the details of the operations of the behavior generation unit 39. As described above, the behavior generation unit 39 determines behavior of the robot 1 with prescribed timing.

Figure 14:
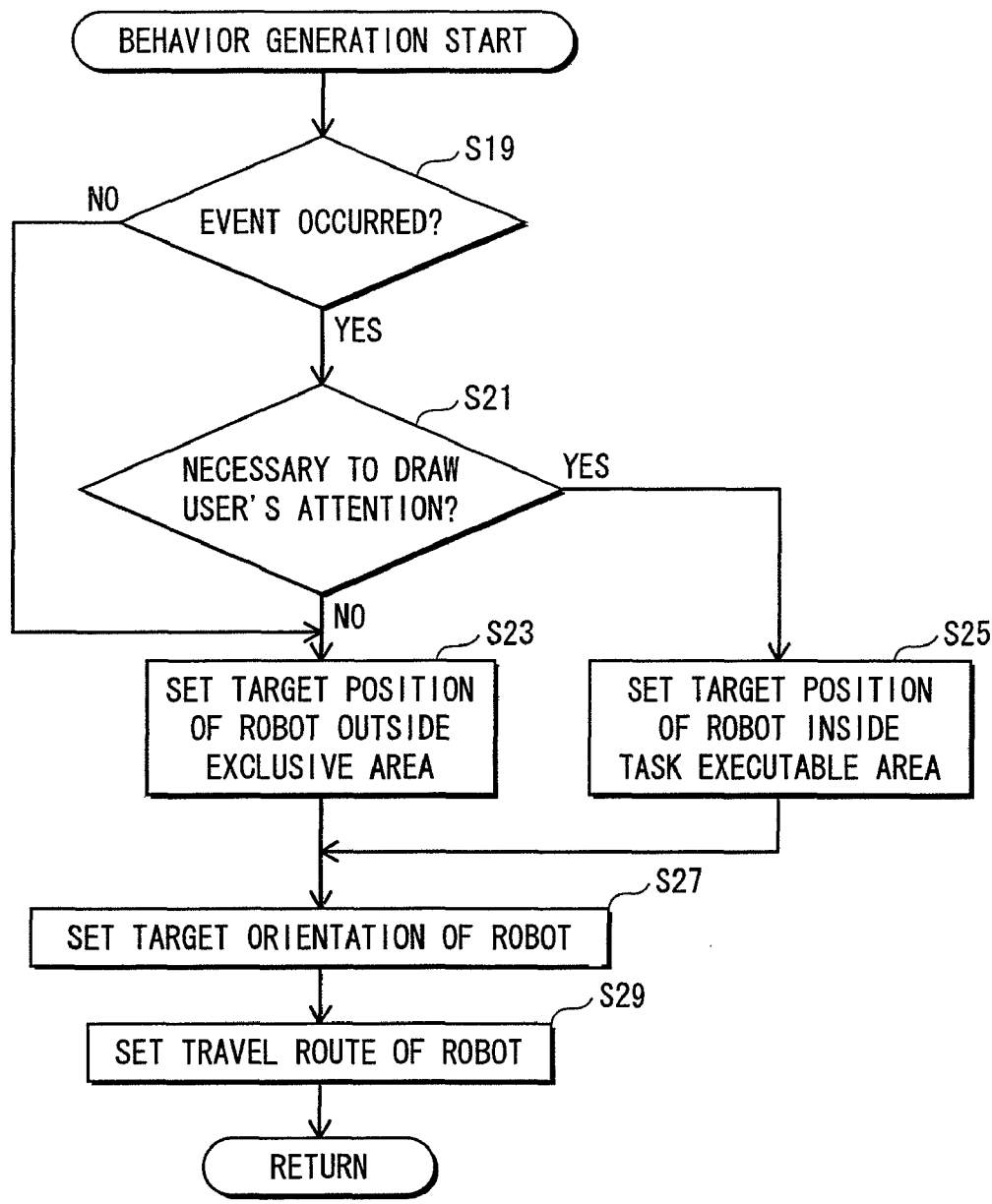
FIG. 14 is a flowchart showing details of operations of a behavior generation unit 39.

FIG. 14 is a flowchart showing the details of the operations of the behavior generation unit 39.

As FIG. 14 shows, the behavior generation unit 39 judges whether a prescribed event that required presentation of information has been occurred (S19).

If a prescribed event has occurred (S19: Y), the behavior generation unit 39 judges whether it is necessary to draw the user's attention, in consideration of the user's state estimated by the user state estimation unit 26 and the importance of the event (S21).

Specifically, an importance level is assigned to each event. Also, a threshold is assigned to each of the patterns to be determined by the user state estimation unit 26. If the importance level of the occurred event is higher than the threshold of the pattern as the result of the estimation performed by the user state estimation unit 26, the behavior generation unit 39 judges that it is necessary to draw the user's attention (S21: Y). In other words, the behavior generation unit 39 judges that information related to the event is to be presented to the user (i.e. there is information to be notified to the user). In this example, the threshold is assigned to each of the patterns to be determined by the user state estimation unit 26. However, the threshold to be compared with the importance level of the event is not necessarily assigned to each pattern. For example, the behavior generation unit 39 may determine whether to perform Step S21 according to whether the importance level that has been assigned to an occurred event is higher than a prescribed threshold.

If the importance level of the occurred event is not higher than the threshold of the pattern as the result of the estimation performed by the user state estimation unit 26, the behavior generation unit 39 judges that it is unnecessary to draw the user's attention (S21: N). In other words, the behavior generation unit 39 judges that information related to the event is not to be presented to the user.

The importance levels of events may be determined in the following manner: For example, regarding information related to occurrence of disaster, such as an earthquake, if it is judged that the event should be immediately notified to the user, the importance level of the event is to be determined to be high. On the other hand, regarding spontaneous emotion expression by the robot 1, if it is judged that it is unnecessary to interfere with the user's actions and present information to the user, the importance level of the event is to be determined to be low.

The following are the rest of the explanations of the behavior generation unit 39.

If the behavior generation unit 39 judges that no event has been occurred in Step S19 (S19: N), and that it is unnecessary to draw the user's attention (S21: N), the behavior generation unit 39 determines the target position of the robot 1 such that the robot 1 goes outside the user's exclusive area defined by the PS setting unit 38 (S23). In some cases, if the robot 1 is already outside the user's exclusive area, it is unnecessary to determine the target position.

In Step S21, if the behavior generation unit 39 judges that it is necessary to draw the user's attention (S21: Y), the behavior generation unit 39 determines the target position of the robot 1 such that the robot 1 goes inside the task executable zone (S25). In Step S25 of this embodiment, the behavior generation unit 39 does not consider the exclusive area when determining the target position of the robot 1. However, the present invention is not limited to this. The behavior generation unit 39 may determine the target position of the robot 1 such that the robot 1 goes into an area that is within the task executable zone and outside (or inside) the exclusive area.

Upon determination of the target position of the robot 1 (S23 or S25), the behavior generation unit 39 determines a target orientation of the robot 1 such that the robot 1 can present information to the user (S27).

The behavior generation unit 39 determines a travel route of the robot 1 so as to achieve the target position and the target position (S29). The determined travel route is output to the action control unit 12. Also, in the case of presenting information, how to present the information is output to the information generation unit 13.

3.4 Behavior of Robot 1

The following briefly explains how the robot 1 behaves according to the determination by the behavior generation unit 39.

Figure 15:
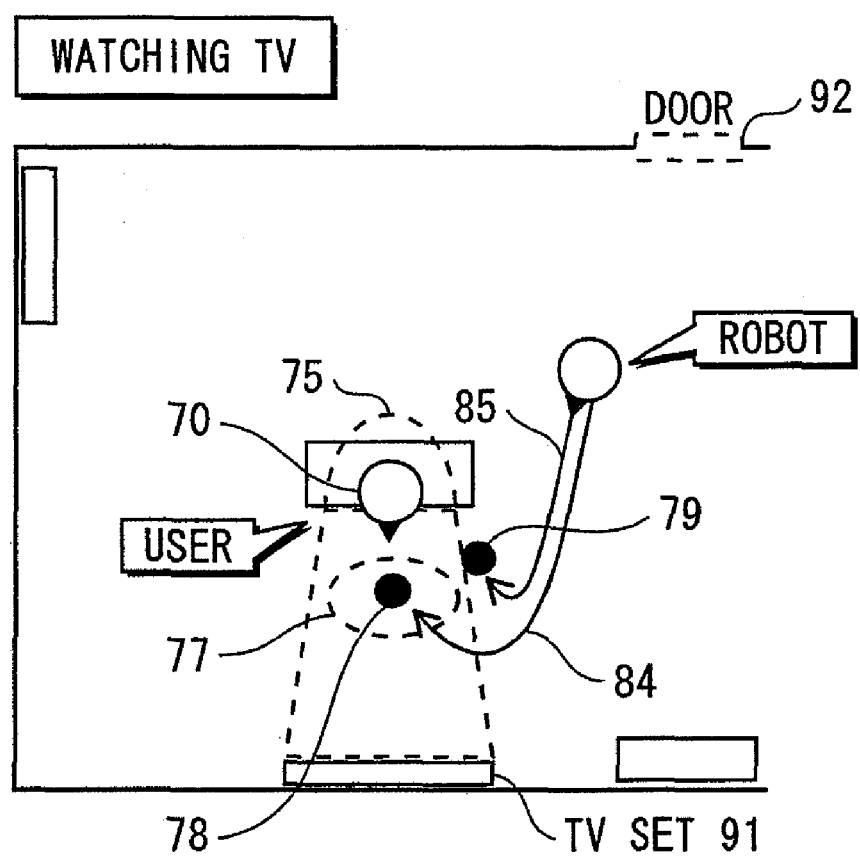
FIG. 15 shows behavior of a robot 1.
Figure 16:
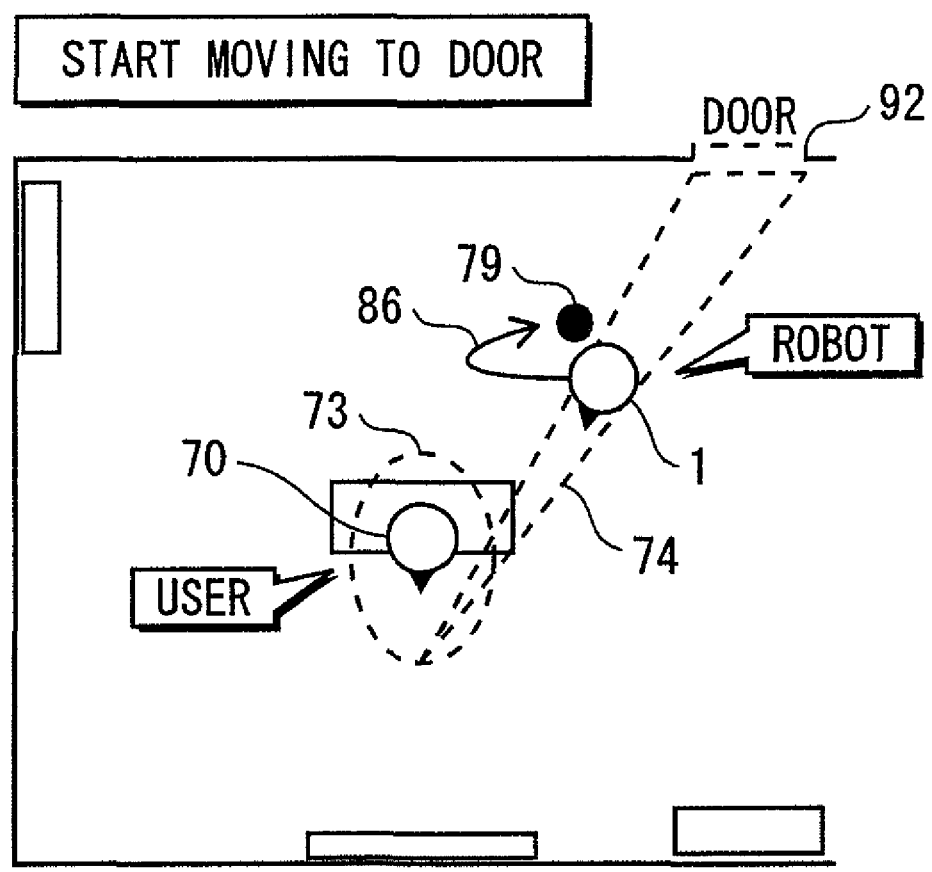
FIG. 16 shows behavior of the robot 1.

FIG. 15 and FIG. 16 show behavior of the robot 1.

In FIG. 15, the user is watching TV. Assume that the robot 1 judges in this situation that it is necessary to draw attention of the user 70 (S21: Y). In this case, the behavior generation unit 39 determines a target position 78 such that the robot 1 goes into a task executable zone 77, without considering the exclusive area 75 (S25). After that, the behavior generation unit 39 determines the target orientation (S27), and determines a travel route 84 (S29).

In Step S21, if the robot 1 judges that it is unnecessary to draw attention of the user 70 (S21: N), the behavior generation unit 39 determines a target position 79 such that the robot 1 goes outside the exclusive area 75 (S23). After that, the behavior generation unit 39 determines the target orientation (S27), and determines a travel route 85 (S29).

In FIG. 16, the user has stopped watching TV, and started moving toward the door. In this case, the area between the user and the door is to be defined as an extended personal space 74 by the PS setting unit 38. In FIG. 16, the extended personal space is defined as a space surrounded by one end of the major axis of the personal space defined in the social psychology and the both ends of the door. The robot 1 exists within this extended personal space 74.

In this case, if the robot 1 judges that it is unnecessary to draw attention of the user 70 (S21: N), the behavior generation unit 39 determines a target position 79 such that the robot 1 goes outside the extended personal space 74. After that, the behavior generation unit 39 determines the target orientation (S27), and determines a travel route 86 (S29).

4. Modification Examples

The following explains modification examples of the present invention.
4.1 Psychological Personal Space The personal space adopted as the exclusive area increases or decreases in size depending on various factors. The PS setting unit 38 may defines the personal space in consideration of the following.

Figure 17:
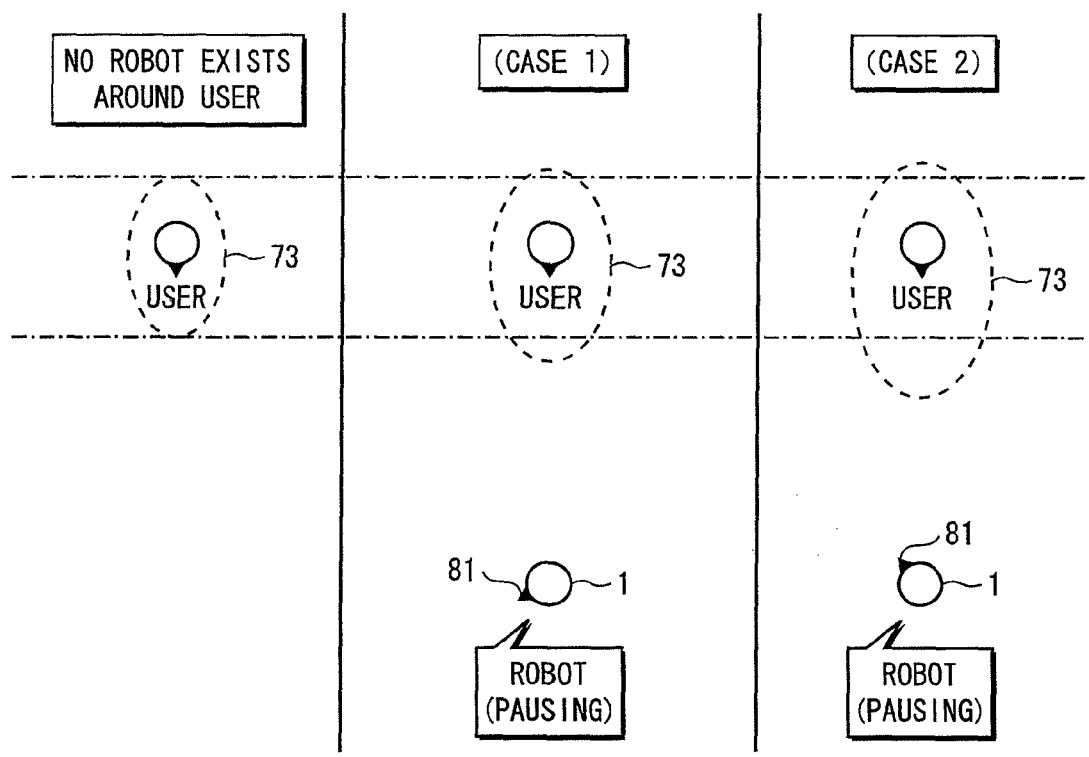
FIG. 17 shows changes of the size of the personal space defined in social psychology.
Figure 18:
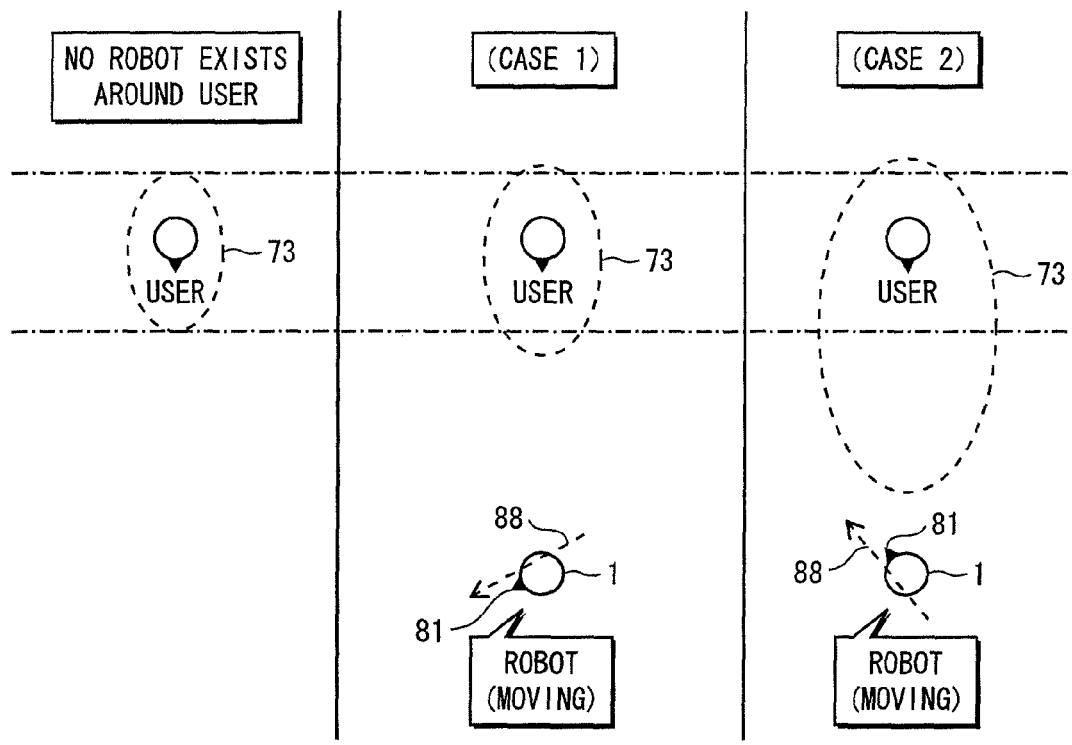
FIG. 18 shows changes of the size of the personal space defined in social psychology.

FIG. 17, FIG. 18, and FIG. 19 show changes of the size of the personal space defined in psychology.
Objects Around User and Orientations of Objects The size of the personal space may be changed based on the positions and the orientations of objects around the user.

For example, as FIG. 17 shows, the size of the personal space 73 changes according to whether any object (e.g. robot 1, a human, and soon) exists around the user, and the orientation of the object. In this drawing, the robot 1 is the object, and an orientation 81 of the robot 1 is also illustrated. This drawing shows that if there is an object around the user (case 1 and case 2 of FIG. 17), the size of the personal space becomes larger than the case where there is no object around the user. Further, the size of the personal space 73 is larger in the case where the object faces the user (case 2) than the case where the object does not face the user (case 1).
Traveling of Object in Sight and Traveling Direction The size of the personal space may be changed based on the traveling direction of the object around the user.

For example, if the object around the user is traveling, the size of the personal space 73 increases (case 1 and case 2). In this drawing, the robot 1 is the object, and the orientation 81 of the robot 1 is also illustrated. Further, the traveling direction of the robot 1 is illustrated as a traveling direction 88. If the object is traveling closer to the user (case 2), the size of the personal space becomes larger than the case where the object is traveling away from the user (case 1).
Social Relationship with Object Around User The size of the personal space may be changed based on social relationship between the user and the humans and the robot 1 around the user.

For example, as FIG. 19 shows, a priority level is given to each user based on social relationship among users. Regarding a relationship between a user "mother" and a user "father" shown as case 1 in FIG. 19, a priority level "0.6" is given to the "mother" and a priority level "0.8" is given to the "father". The personal space of a user having a high priority level is extended. In the case 2 shown in FIG. 19, it is assumed that the relationship between a user "mother" and a user "child" is close. As a result, the priority level given to the "mother" in this case is lower than the case of the "mother" and the "father". Also, a low priority level "0.2" is given to the user "child" as the "child" is more dependent on the user "mother" than on the user "father".

The social relationship among users and social relationship between each of the users and the robot 1 may have been stored in the behavior control apparatus 11, or registered in the user information database 24 after estimation of social relationship among the users based on image information and sound information obtained by the information collection unit 21.

For example, it is possible to estimate social relationships among a plurality of users based on words extracted from conversations collected by the microphone 35 and reflecting social roles or social relationships, such as "dad", "mom", "child", "manager", and "teacher". The social relationship mentioned here is whether the user is the owner of the robot 1, and the order in age, job ranking, etc. The social relationship registered in the user information database 24 may be updated according to need.

The explanation of the behavior generation unit 39 above describes that the potential field is generated at the determination of the travel route. In this regard, the potential of the personal space of a user with a high priority level may be determined to be higher than potentials of the other users.

Also, the size of the personal space may be changed based on whether the user is the owner of the robot 1. If the user is the owner, it can be assumed that the user has a close relationship with the robot 1. Accordingly, the personal space of the user may be determined to be small. Also, the personal space of the user may be determined with reference to the use duration 114 of the user attribute information 110 so as to decrease as the use duration increases
Sex The shape of the personal space may differ according to the sex of the user. Generally, it is assumed that the shape of the personal spaces of a male is closer to a circle than the shape of the personal spaces of a female.
Emotion of User The size of the personal space may be changed according to the emotion of the user. For example, if the emotion estimation unit estimates that that the user's emotion is "uncomfortable" or "anger", the size of the personal space will be increased. As a result, the robot moves away from the user to appease the user's emotion.
4.2 Extended Personal Space The following is a supplementary explanation of determination of an extended personal space between users by the PS setting unit 38.

FIG. 20 shows example settings of an extended personal space.

For example, for defining an extended personal space between two users having a conversation as the case of "two people" in FIG. 20 shows, a space formed by the minor axes of the personal spaces of the users may be defined as the extended personal space. In the case of "two people" shown in FIG. 20, the area surrounded by the both ends of the minor axis of the personal space 73a of the "USER A" and the both ends of the minor axis of the personal space 73b of the "USER B" is defined as the extended personal space 74.

In the case where three or more people are having a conversation, an extended personal space for two of the people is firstly defined. In the case of "three people" shown in FIG. 20, extended personal spaces 74ab, 74ac, 74bc are defined between each two of the users, based on the personal space 73a of the "USER A", the personal space 73b of the "USER B" and the personal space 73c of the "USER C". If this is the case, a free space 89 might be generated as surrounded by the extended personal spaces 74ab, 74ac and 74bc. The PS setting unit 38 may also define this free space 89 as part of the extended personal space.

The following is a supplemental explanation about how the user state estimation unit 26 estimates that the users are communicating with each other. As a user state 161 "TALKING" of FIG. 6 shows, the user state estimation unit 26 judges that a plurality of users are having a conversation when, for example, the users are within a prescribed distance from each other (i.e. a user's sight includes all the other users) and each user (or at least one of the users) is uttering a voice (see the object state 164, etc).

In addition, the user state estimation unit 26 may judge that a user is communicating with the other user by gesture in consideration of the user's action without considering the voice. For example, it is possible to make the judgment above by analyzing frames of images by the image recognition technique or the like. If this is the case, the user state estimation unit 26 may judge that a user is gesturing if a plurality of users are gathered together and at least one of them is moving his/her body.

4.3 Method for Information Presentation

In the embodiment above, it is described that the behavior generation unit 39 determines the travel route of the robot 1 such that the target position and the target orientation are achieved (S29). Here, the behavior generation unit 39 may determine the travel route of the robot 1 in accordance with the user's action assumed by the user state estimation unit 26. For example, if the robot 1 can not move into the user's sight, it is not likely that the robot 1 will be recognized by the user by visual information presentation with blinking of the LED. Therefore, if the behavior pattern estimated by the user state estimation unit 26 shows that the user can not see the robot 1, the behavior generation unit 39 may decide to present information using sound. In other words, if any one (or more) of information presentation methods targeting auditory sense or visual sense of the user has been estimated to be not effective, the robot 1 may present information in a manner that can be recognized by the user. Alternatively, a method for information presentation may have been determined for each of the patterns as results of the estimation by the user state estimation unit 26.

Also, the behavior generation unit 39 may determine the TRAVEL ROUTE to the target position according to the user's behavior estimated by the user state estimation unit 26. For example, if the user feels uncomfortable or it is inappropriate to interfere with the user's action, the robot 1 may be controlled not to get close to the user's exclusive area. In contrast, to move the robot 1 into the task executable zone, the robot 1 may be controlled to make various gestures while moving to the target position, depending on the user's state.

<Supplemental Explanations>

The behavior control apparatus pertaining to the present invention is described above based on the embodiment. However, the present invention is not limited to the embodiment, and it may be modified as follows.

(1) The apparatus described above is, specifically, a computer system structured from a microprocessor, a ROM, a RAM, a hard disk unit, a display unit, a keyboard, a mouse, and so on. The RAM or the hard disk unit stores therein a computer program. The apparatus carries out functions as a result of the microprocessor operating in accordance with the computer program. The computer program is structured from a combination of a plurality of instruction codes that each indicate an instruction for carrying out a prescribed function. The apparatus is not limited to the computer system including all the above-mentioned components, namely a microprocessor, a ROM, a RAM, a hard disk unit, a display unit, a keyboard, a mouse, and so on. Alternatively, the computer system may be structured from some of the components.

(2) Part or all of the components included in the apparatus may be structured from a single system LSI (Large Scale Integration). A system LSI is a super multifunctional LSI manufactured by integrating a plurality of components on a single chip, and it is, specifically, a computer system structured from a microprocessor, a ROM, a RAM and so on. The RAM stores therein a computer program. The apparatus carries out functions as a result of the microprocessor operating in accordance with the computer program.

Note that although LSI is used here, the circuit may be variously described as IC, system LSI, super LSI or ultra LSI depending on the level of integration. Also, the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, or the like is considered to be a possibility.

(3) Part or all of the components included in the apparatus may be structured by an IC card or a single module which is attachable to the apparatus. The IC card or the module is a computer system structured from a microprocessor, a ROM, a RAM and the like. The IC card and the module may include the above-described super multifunctional LSI. The IC card or the module carries out functions as a result of the mircoprocessor operating in accordance with a computer program. The IC card or the module may be tamper-resistant.

(4) The present invention may be a method shown above. Furthermore, the method may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Also, the present invention may be the computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

(5) The present invention may be any combination of the above-described embodiment and modifications.

What is claimed is:

1. A behavior control apparatus for controlling a mobile object having a movement mechanism, the behavior control apparatus comprising:

an acquiring unit operable to acquire a position and an orientation of a human;

a setting unit operable to determine a shape of an exclusive area for the human according to the acquired orientation, and set the exclusive area having the shape for the human with reference to the acquired position;

a behavior generation unit operable to judge whether an event has occurred which requires information to be provided to the human; and a behavior determination unit which controls the movement mechanism of the mobile object such that the mobile object moves out of the exclusive area if the behavior generation unit judges that the event has not occurred, and wherein the behavior determination unit controls the movement mechanism of the mobile object such that the mobile object enters a task executable area if the behavior generation unit judges that the event has occurred.

2. The behavior control apparatus of claim 1, wherein the setting unit includes a state estimation unit operable to estimate which of a plurality of prescribed patterns shows a behavior of the human, and wherein the setting unit determines the shape of the exclusive area according to a pattern that has been estimated by the state estimation unit as showing the behavior of the human.

3. The behavior control apparatus of claim 2, wherein the setting unit determines the shape of the exclusive area according to both a psychological personal space of the human and the pattern that has been estimated by the state estimation unit.

4. The behavior control apparatus of claim 1, wherein the setting unit determines the shape of the exclusive area according to a psychological personal space of the human.

5. The behavior control apparatus of claim 2, further comprising a reading unit operable to read landmark information in which types and positions of landmarks are associated one-to-one with each other, wherein the state estimation unit specifies a landmark that exists within sight of the human based on the landmark information, and performs the estimation based on a type of the specified landmark, the sight being determined based on the orientation of the human, and wherein the setting unit sets the exclusive area based on a position of the specified landmark and the position of the human.

6. The behavior control apparatus of claim 5, wherein the setting unit sets, as the exclusive area, an area that is surrounded by one or more points that are based on the position of the landmark and one or more points that are based on the position of the human.

7. The behavior control apparatus of claim 5, wherein the reading unit further reads state information showing states of the landmarks, and wherein the state estimation unit performs the estimation based on the type of the specified landmark and a state of the specified landmark shown by the state information.

8. The behavior control apparatus of claim 5, wherein the acquiring unit further acquires a posture of the human, and wherein the state estimation unit performs the estimation based on the type of the specified landmark and the posture of the human.

9. The behavior control apparatus of claim 8, wherein the state estimation unit performs the estimation based on the type of the specified landmark and a change of the posture of the human.

10. The behavior control apparatus of claim 2, wherein the acquiring unit acquires a position and an orientation of a first human and a position and an orientation of a second human, wherein the state estimation unit estimates whether the first human is communicating with the second human based on the position and the orientation of the first human and the position and the orientation of the second human, and wherein the setting unit sets the exclusive area based on the position and the orientation of the first human and the position and the orientation of the second human if the state estimation unit estimates that the first human is communicating with the second human.

11. The behavior control apparatus of claim 10, wherein the state estimation unit estimates whether one of the patterns estimated as a behavior of the first human shows communication with the second human, based on whether the second human exists within sight of the first human, the sight being determined based on the orientation of the first human.

12. The behavior control apparatus of claim 10, wherein the communication is in a form of a conversation with use of a voice, wherein the acquiring unit includes a voice acquiring unit operable to acquire a voice, wherein the state estimation unit includes a voice judging unit operable to judge whether a human utters a voice, based on the acquired voice, and wherein the state estimation unit estimates whether the one of the patterns estimated as the behavior of the first human shows the conversation with the second human, based on the position of the first human and the position of the second human and whether the first human and the second human utter a voice.

13. The behavior control apparatus of claim 10, wherein the communication is in a form of a gesture.

14. The behavior control apparatus of claim 2, wherein the behavior generation unit includes an importance level judging unit operable to judge, when the behavior generation unit judges that the event has occurred, whether the pattern that has been estimated by the state estimation unit allows the notification, based on an importance level of the event, and wherein the behavior generation unit judges that the event has occurred which requires information to be provided to the human if the importance level judging unit judges that the pattern estimated by the state estimation unit allows the notification.

15. The behavior control apparatus of claim 1, wherein the task executable area is an area in which the mobile object notifies the human of the information, and wherein if the behavior generation unit that the event has occurred the behavior determination unit controls the mobile object so as to enter the task executable area and present the information to the human.

16. The behavior control apparatus of claim 1, wherein the mobile object presents the information to the human using an information presentation mechanism, wherein the setting unit includes a state estimation unit operable to estimate which of prescribed patterns shows a behavior of the human, and wherein if the behavior generation unit that the event has occurred the behavior determination unit determines a method by which the information is to be presented by the information presentation mechanism, according to the pattern that has been estimated by the state estimation unit, and controls the information presentation mechanism so as to present the information by the determined manner.

17. The behavior control apparatus of claim 1, wherein the setting unit includes a state estimation unit operable to estimate which of prescribed patterns shows a behavior of the human, and wherein the behavior determination unit determines a travel route of the mobile object according to a pattern that has been estimated by the state estimation unit as showing the behavior of the human.

18. The behavior control apparatus of claim 4, wherein the setting unit determines the shape of the exclusive area according to sex of the human.

19. The behavior control apparatus of claim 4, wherein the setting unit determines the shape of the exclusive area according to social relationship between the human and another human existing within sight of the human or the mobile object existing within the sight of the human, the sight being determined based on the orientation of the human.

20. The behavior control apparatus of claim 4, wherein the setting unit determines the shape of the exclusive area according to an orientation of another human existing within sight of the human or an orientation of the mobile object existing within the sight of the human, the sight being determined based on the orientation of the human.

21. The behavior control apparatus of claim 4, wherein the setting unit determines the shape of the exclusive area according to a moving direction of another human existing within sight of the human or a moving direction of the mobile object existing within the sight of the human, the sight being determined based on the orientation of the human.

22. A mobile object comprising:
a movement mechanism; and
a behavior control apparatus,
wherein the behavior control apparatus includes:
(i) an acquiring unit operable to acquire a position and an orientation of a human;
(ii) a setting unit operable to determine a shape of an exclusive area for the human according to the acquired orientation, and set the exclusive area having the shape for the human with reference to the acquired position;
(iii) a behavior generation unit operable to judge whether an event has occurred which requires information to be provided to the human; and
(iv) a behavior determination unit which controls the movement mechanism of the mobile object such that the mobile object moves out of the exclusive area if the behavior generation unit judges that the event has not occurred, and wherein the behavior determination unit controls the movement mechanism of the mobile object such that the mobile object enters a task executable area if the behavior generation unit judges that the event has occurred.

23. A behavior control method for controlling behavior of a mobile object having a movement mechanism, the behavior control method comprising:
acquiring a position and an orientation of a human;
determining a shape of an exclusive area for the human according to the acquired orientation;
setting the exclusive area having the shape for the human with reference to the acquired position;
judging whether an event has occurred which requires information to be provided to the human; and
controlling the movement mechanism of the mobile object such that the mobile object moves out of the exclusive area if the event has not occurred, and such that the mobile object enters a task executable area if the event has occurred.

24. A non-transitory computer-readable recording medium on which is recorded a computer program for instructing a behavior control apparatus to control behavior of a mobile object having a movement mechanism, the computer program causing the behavior control apparatus to perform steps comprising:
acquiring a position and an orientation of a human;
determining a shape of an exclusive area for the human according to the acquired orientation;
setting the exclusive area having the shape for the human with reference to the acquired position;
judging whether an event has occurred which requires information to be provided to the human; and
controlling the movement mechanism of the mobile object such that the mobile object moves out of the exclusive area if the event has not occurred, and such that the mobile object enters a task executable area if the event has occurred.

25. The method of claim 23, wherein said controlling operation includes controlling the mobile object, if the event has occurred, to enter the task executable area and present the information to the human from the task executable area using an information presentation mechanism.

\* \* \* \* \*